US009884293B2

(12) United States Patent
Itoh et al.

(10) Patent No.: US 9,884,293 B2
(45) Date of Patent: Feb. 6, 2018

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Kazuhiro Itoh, Mishima (JP); Hiromasa Nishioka, Susono (JP); Yoshihisa Tsukamoto, Susono (JP); Hiroshi Ohtsuki, Gotenba (JP); Yasumasa Notake, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 7 days.

(21) Appl. No.: 15/098,633

(22) Filed: Apr. 14, 2016

(65) Prior Publication Data
US 2016/0303512 A1 Oct. 20, 2016

(30) Foreign Application Priority Data
Apr. 15, 2015 (JP) ................................. 2015-083777

(51) Int. Cl.
*B01D 53/94* (2006.01)
*F01N 3/20* (2006.01)
(Continued)

(52) U.S. Cl.
CPC ..... *B01D 53/9495* (2013.01); *B01D 53/9418* (2013.01); *B01J 23/002* (2013.01);
(Continued)

(58) Field of Classification Search
None
See application file for complete search history.

(56) References Cited

U.S. PATENT DOCUMENTS

| 2008/0286184 | A1 | 11/2008 | Ando et al. | |
|---|---|---|---|---|
| 2010/0196221 | A1* | 8/2010 | Ando | B01D 53/925 422/171 |
| 2013/0340412 | A1* | 12/2013 | Ichikawa | F01N 3/08 60/286 |

FOREIGN PATENT DOCUMENTS

| JP | 2008-279334 | 11/2008 |
|---|---|---|
| JP | 2014-5742 | 1/2014 |

* cited by examiner

*Primary Examiner* — Walter D. Griffin
*Assistant Examiner* — Jelitza M Perez
(74) *Attorney, Agent, or Firm* — Finnegan, Henderson, Farabow, Garrett & Dunner, LLP

(57) ABSTRACT

An object is to provide technology that enables an NOx catalyst to exercise its NOx reduction capability satisfactorily at any flow speed of the exhaust gas flowing into the NOx catalyst. An exhaust gas purification apparatus for an internal combustion engine includes a selective catalytic reduction NOx catalyst including at least a first catalyst layer having capability of reducing NOx and a second catalyst layer having oxidation capability and arranged closer to a catalyst substrate than the first catalyst layer. The apparatus has a supply valve for adding a specific addition quantity of reducing agent for reducing NOx to inflowing exhaust gas flowing into the selective catalytic reduction NOx catalyst. The apparatus further has a controller that is configured to control addition of the reducing agent by the supply valve based on the flow speed of the inflowing exhaust gas in such a way that the concentration of the reducing agent in a reducing agent atmosphere formed in the inflowing exhaust gas in a reducing agent addition period becomes equal to a specific concentration that is determined based on the flow speed of the inflowing exhaust gas and at which the reducing agent is assumed not to reach the second catalyst layer, when the temperature of the selective catalytic reduction NOx (Continued)

catalyst exceeds a specific temperature at which reduction of NOx by the first catalyst layer is carried out.

9 Claims, 14 Drawing Sheets

(51) Int. Cl.
*B01J 37/02* (2006.01)
*B01J 23/00* (2006.01)
*B01J 23/34* (2006.01)
*B01J 29/072* (2006.01)
*F01N 3/10* (2006.01)
*F01N 9/00* (2006.01)

(52) U.S. Cl.
CPC ............. *B01J 23/34* (2013.01); *B01J 29/072* (2013.01); *B01J 37/0244* (2013.01); *B01J 37/0246* (2013.01); *F01N 3/103* (2013.01); *F01N 3/208* (2013.01); *F01N 9/00* (2013.01); B01D 2251/2067 (2013.01); B01D 2255/20738 (2013.01); B01D 2255/20761 (2013.01); B01D 2255/50 (2013.01); B01D 2255/9022 (2013.01); B01D 2255/911 (2013.01); B01D 2258/012 (2013.01); B01J 2229/186 (2013.01); B01J 2523/00 (2013.01); F01N 3/2066 (2013.01); F01N 2510/06 (2013.01); F01N 2900/1411 (2013.01); F01N 2900/1602 (2013.01); F01N 2900/1818 (2013.01); Y02T 10/24 (2013.01); Y02T 10/47 (2013.01)

[Fig. 1A]
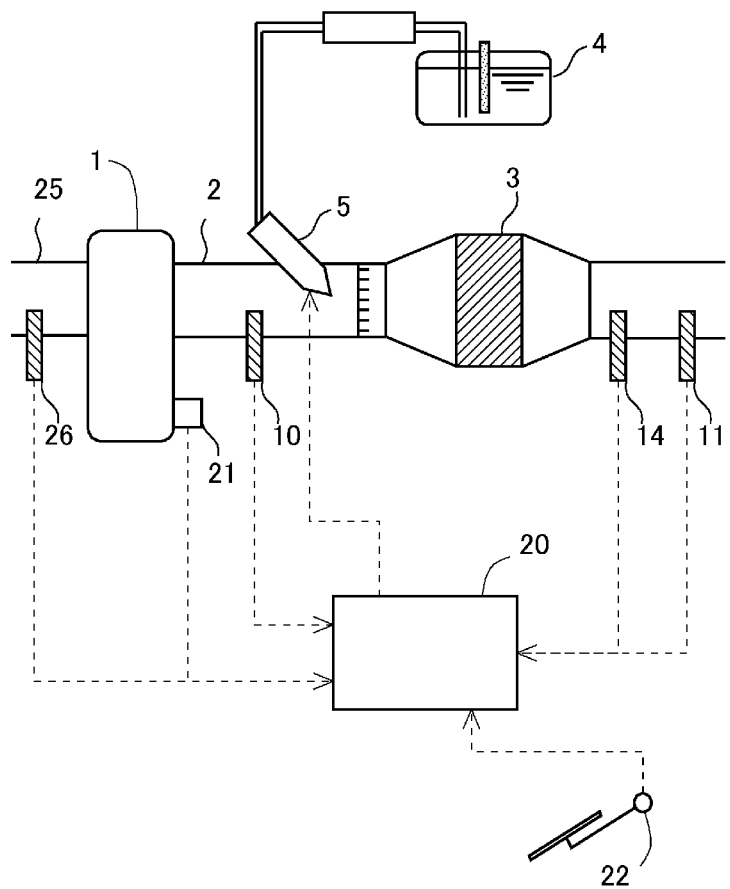

[Fig. 1B]
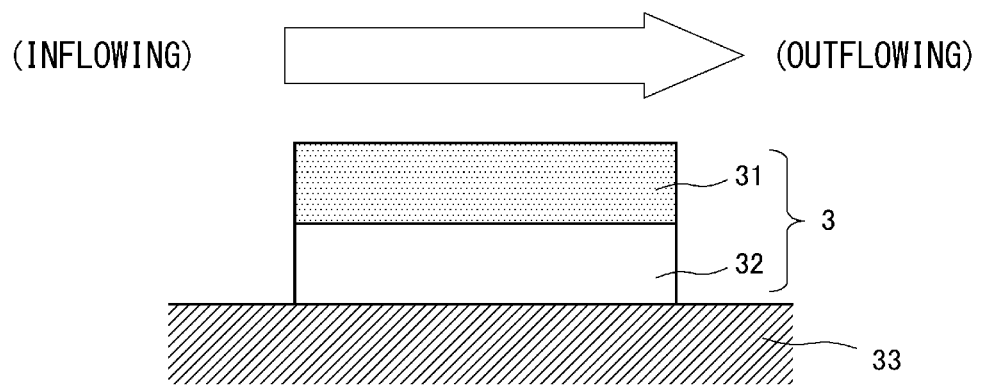

[Fig. 2]
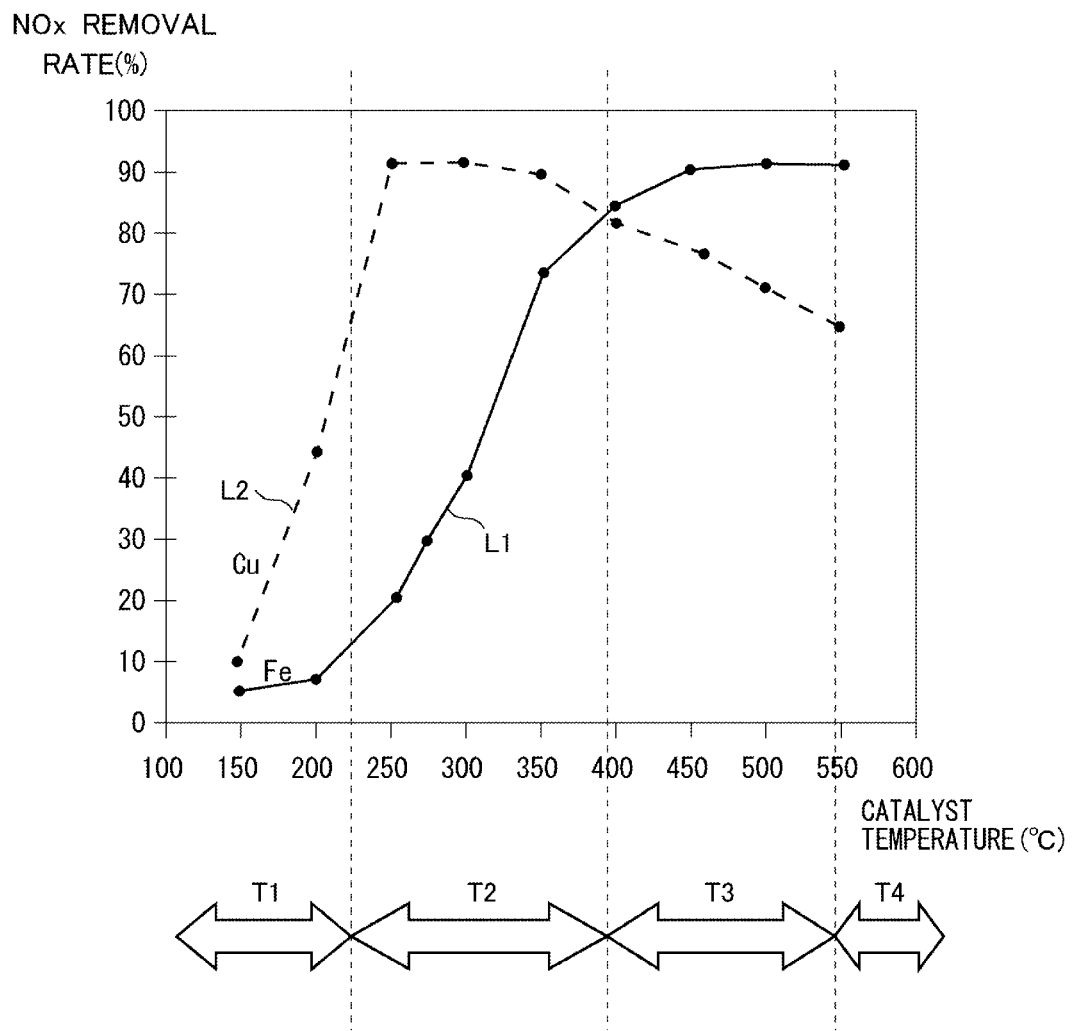

[Fig. 3]
(a)
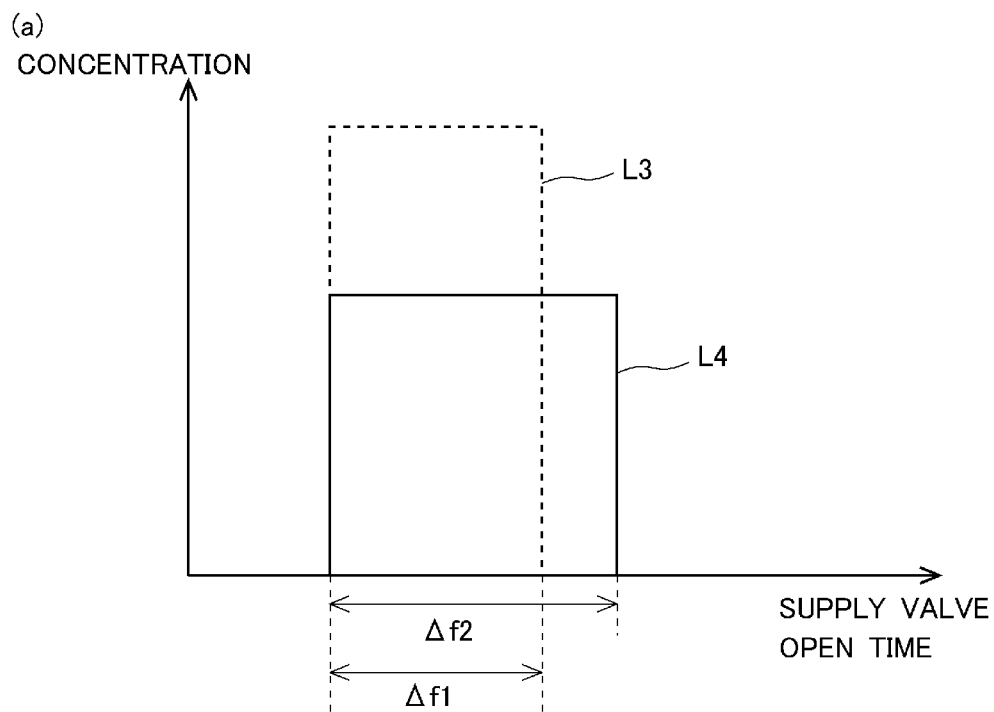
(b)
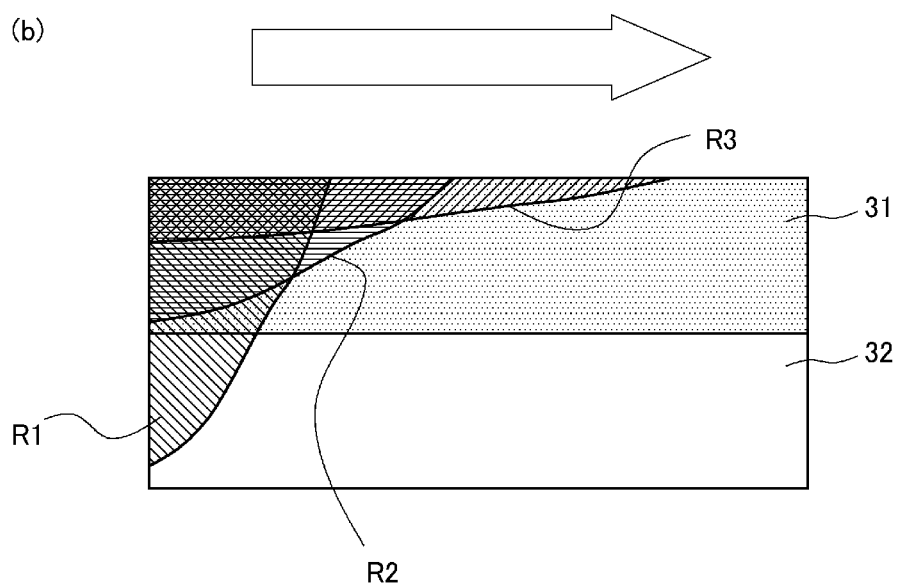

[Fig. 4A]
(a)
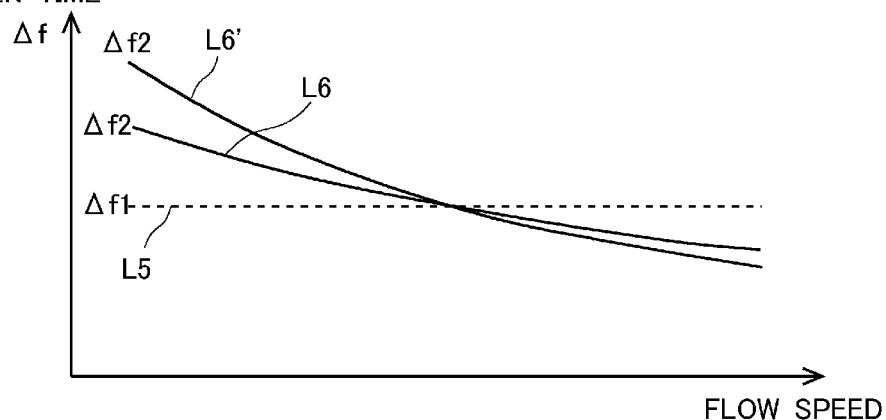
(b)
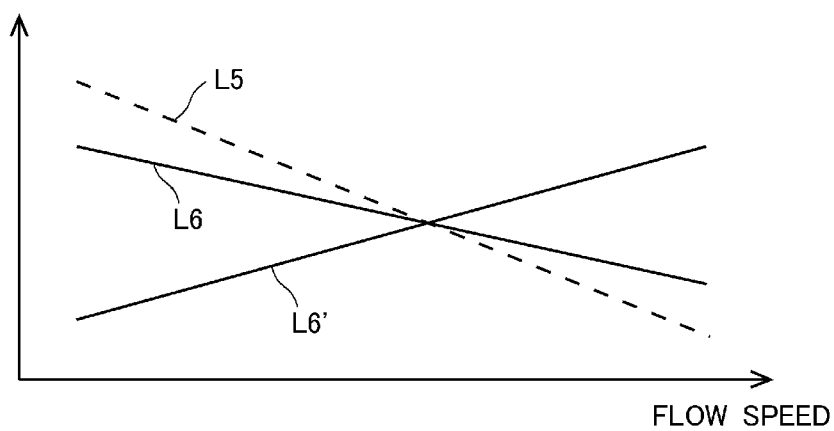

[Fig. 4B]
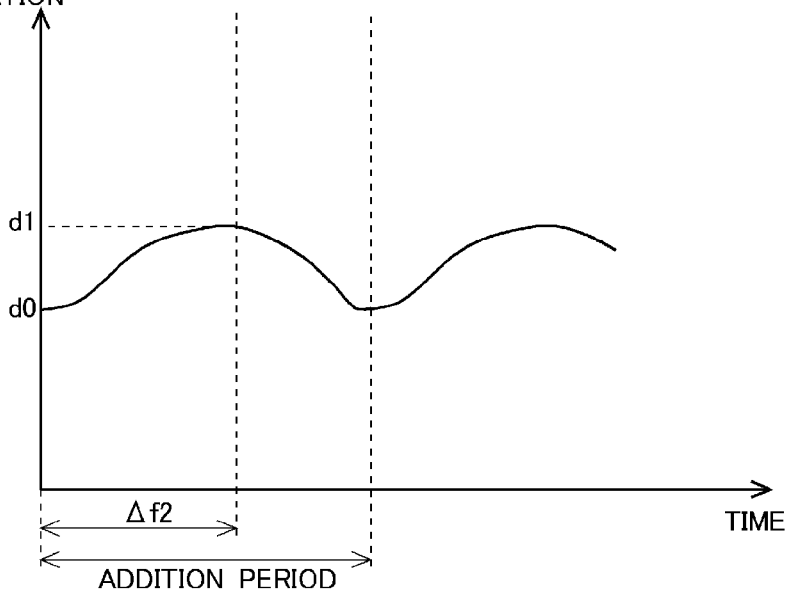
(a) LOW FLOW SPEED
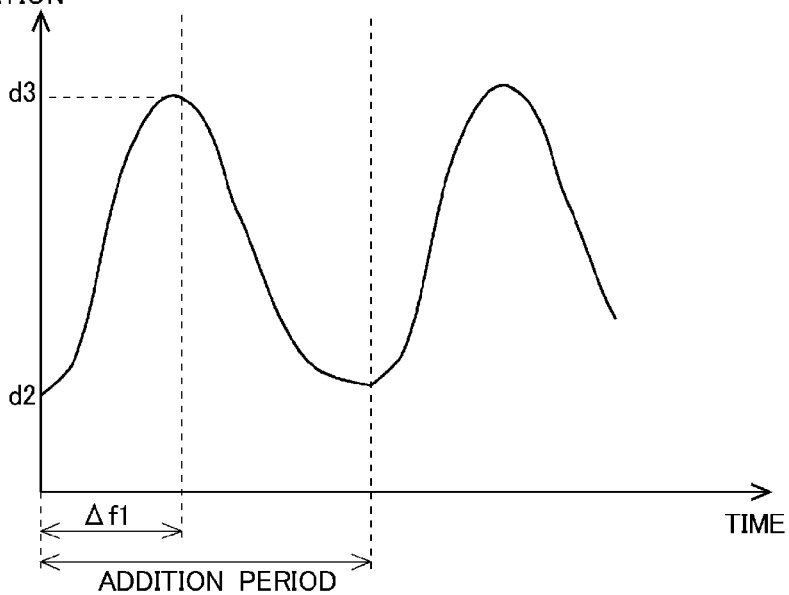
(b) HIGH FLOW SPEED

[Fig. 5]
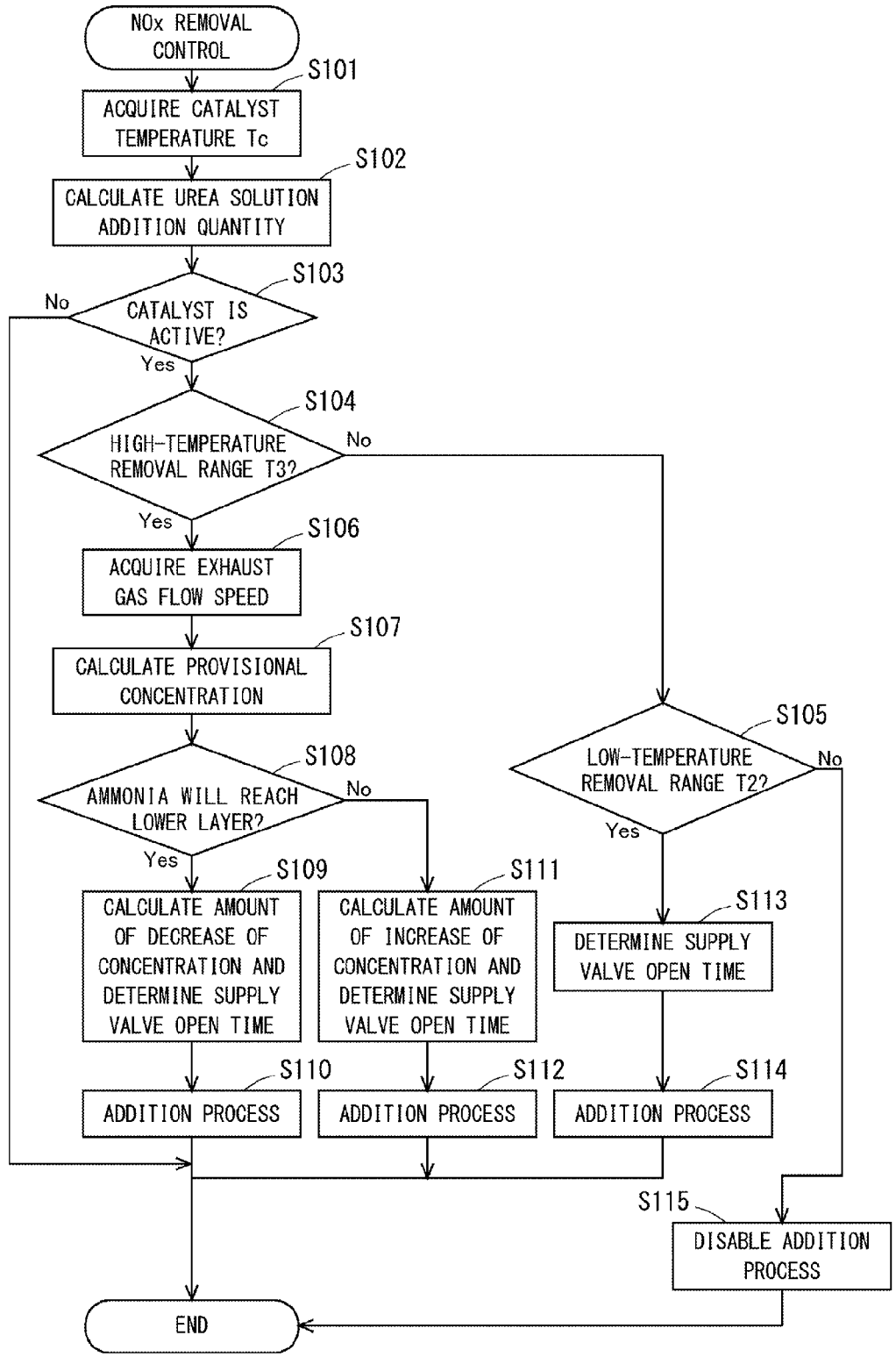

[Fig. 6]
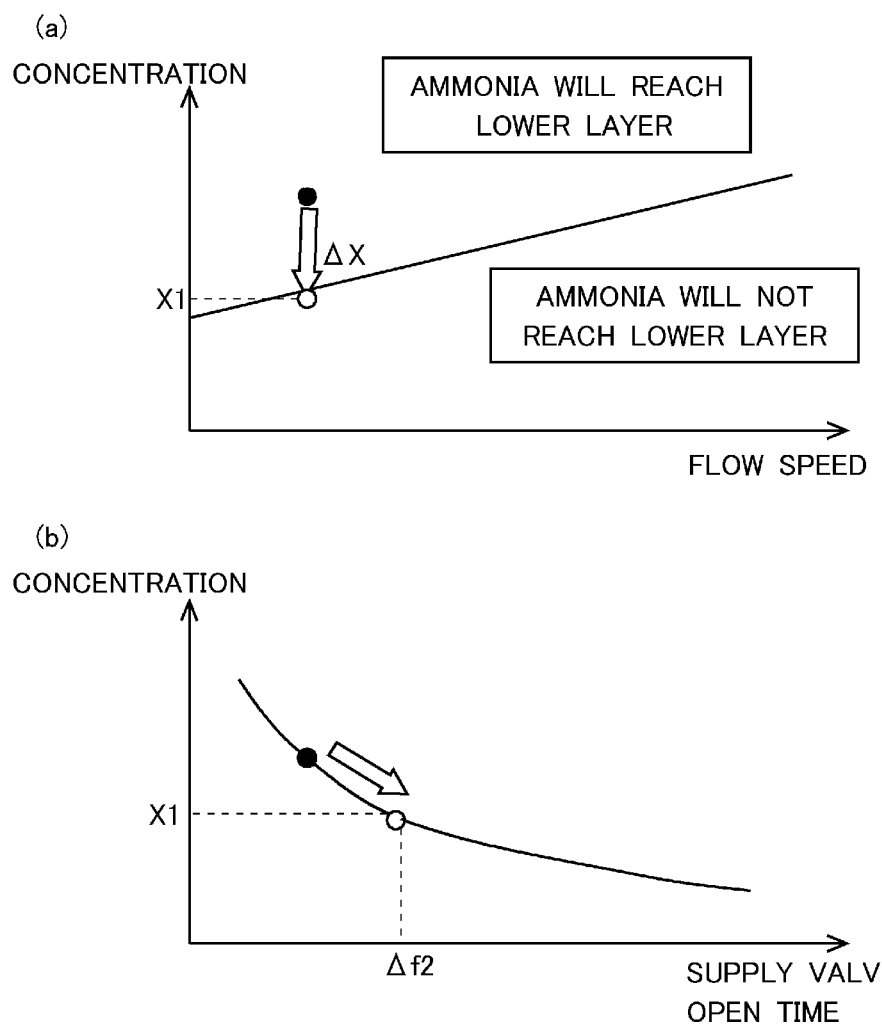

[Fig. 7]
(a)
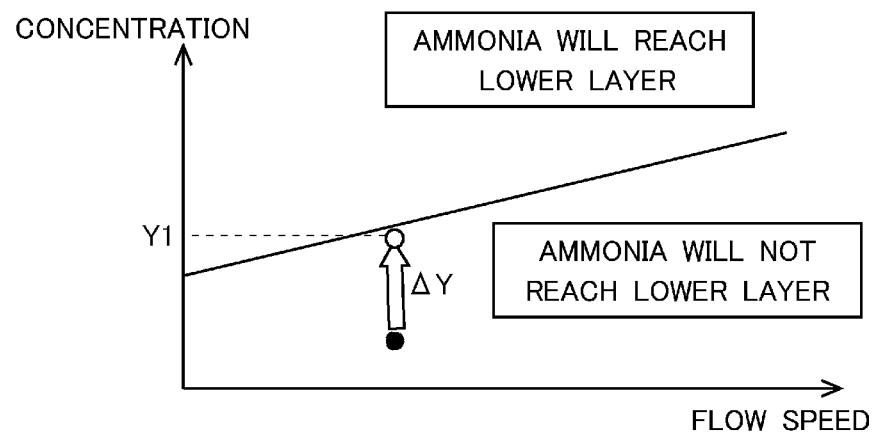
(b)
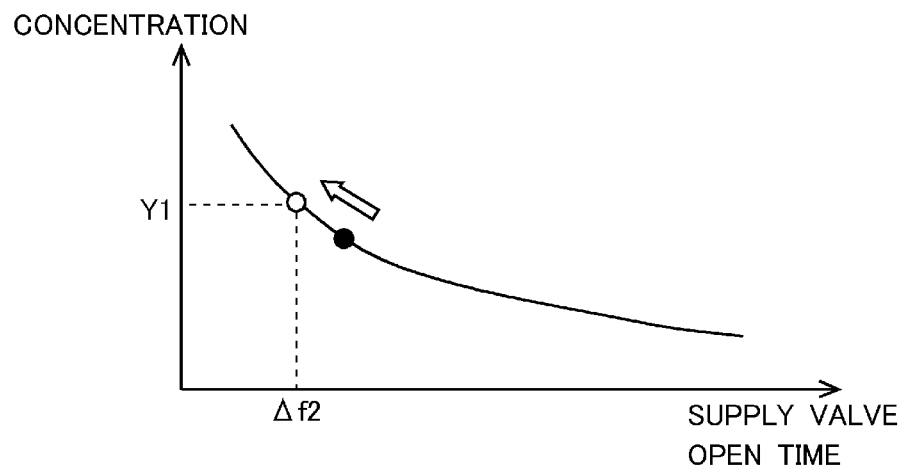

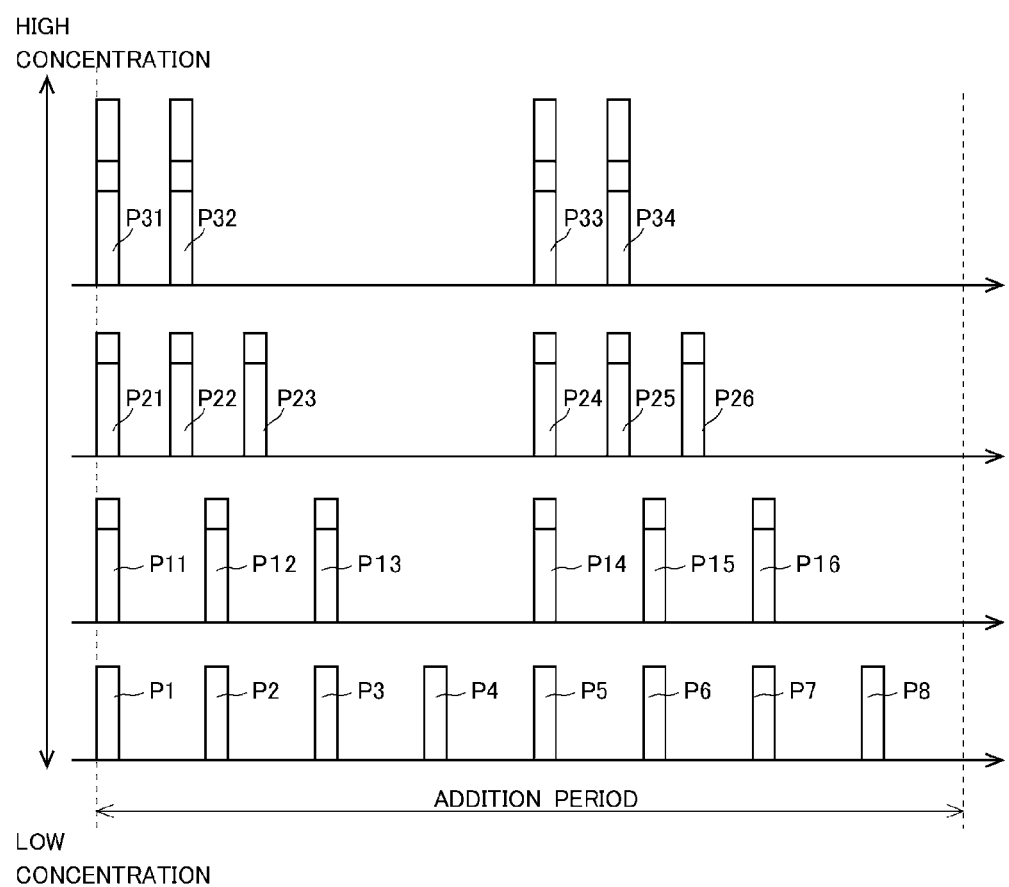

[Fig. 8B]
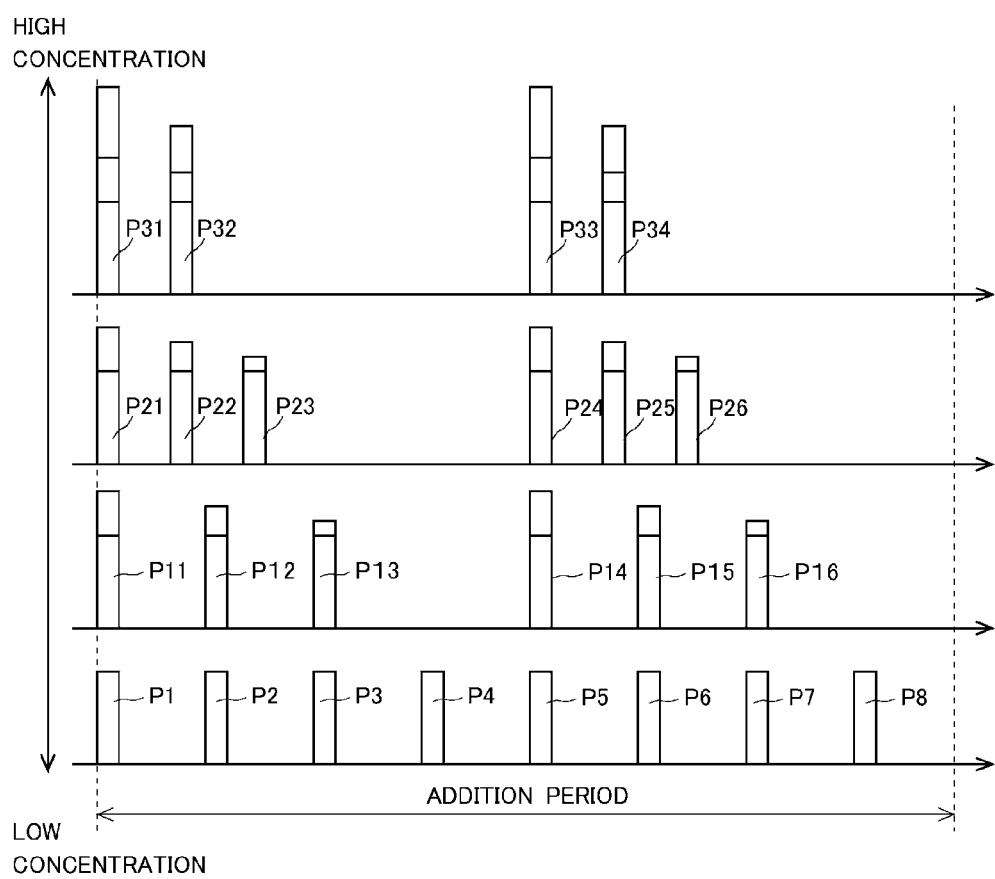

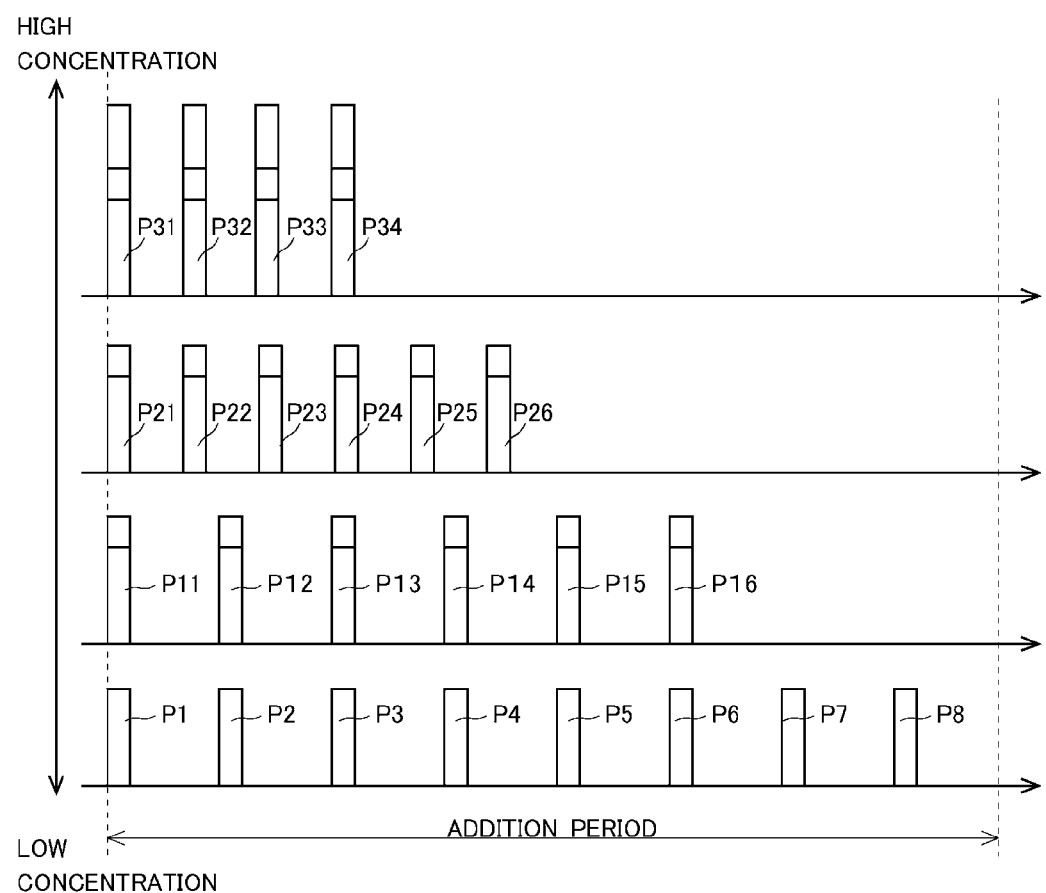
[Fig. 8C]

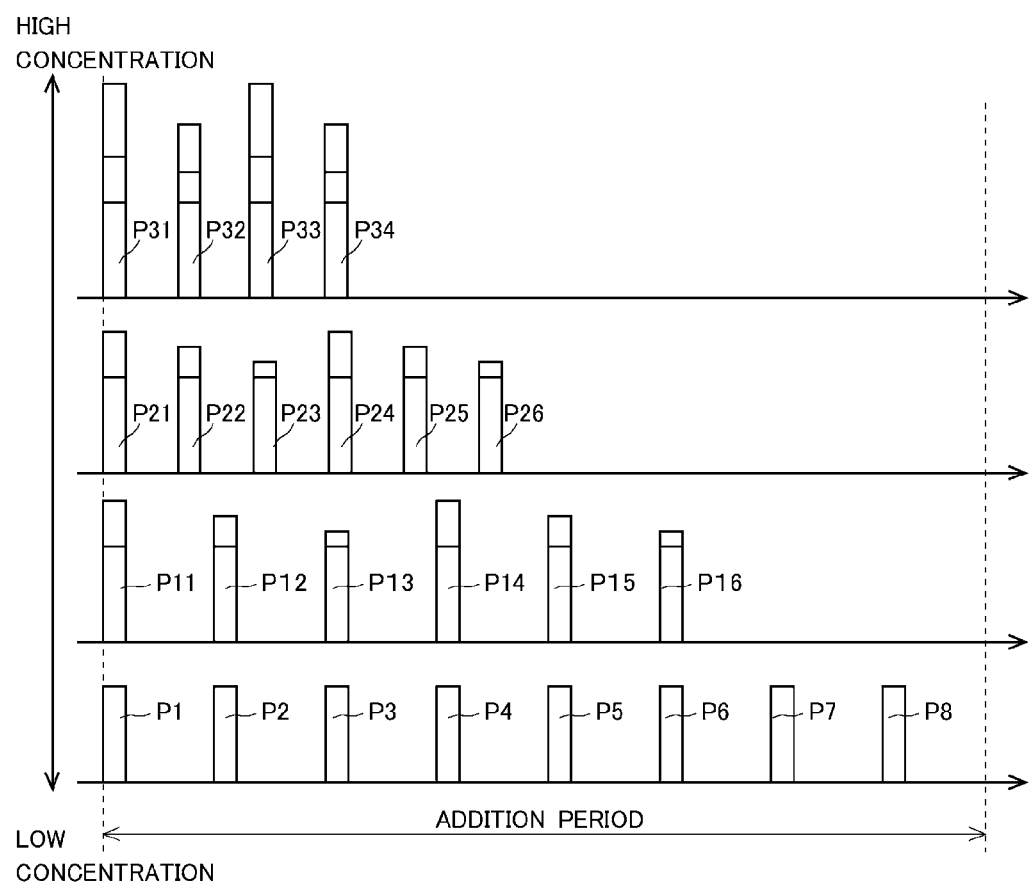
[Fig. 8D]

[Fig. 9]
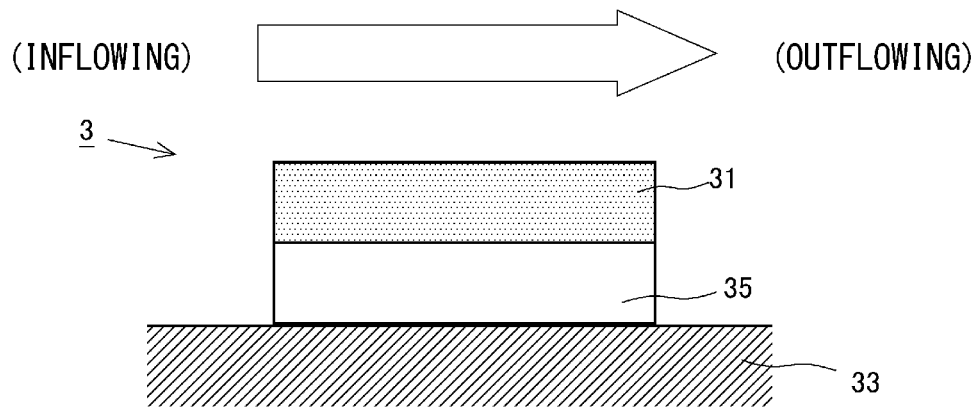

EXHAUST GAS PURIFICATION APPARATUS FOR INTERNAL COMBUSTION ENGINE

TECHNICAL FIELD

The present invention relates to an exhaust gas purification apparatus for an internal combustion engine.

BACKGROUND ART

There are internal combustion engines provided with a selective catalytic reduction NOx catalyst (which will be sometimes simply referred to as "NOx catalyst" hereinafter) for reducing NOx in the exhaust gas provided in an exhaust passage. A typical NOx catalyst includes at least one kind of active component such as Fe or Cu having the function of selectively reducing NOx, which is carried in micropores of zeolite by ion exchange.

With the NOx catalyst, NOx in the exhaust gas is selectively reduced with supply of a reducing agent such as ammonia. When the catalyst temperature of the NOx catalyst is low, satisfactory NOx removal efficiency tends not to be achieved. As a countermeasure, patent literature 1 discloses an NOx catalyst constructed in a two-layer structure including a lower catalyst layer and an upper catalyst layer with the lower catalyst layer having oxidation capability exercised by noble metal and the upper layer not having oxidation capability but having only reduction capability. Patent literature 1 describes oxidation of NO (nitrogen monoxide) into $NO_2$ by the lower catalyst layer and the use of the resultant $NO_2$ for reduction of NOx by the upper catalyst layer with ammonia.

CITATION LIST

Patent Literature

PTL 1: Japanese Patent Application Laid-Open No. 2008-279334
PTL 2: Japanese Patent Application Laid-Open No. 2014-005742

SUMMARY OF INVENTION

Technical Problem

In the above-described prior art, the NOx catalyst is constructed in a two-layer structure including a lower catalyst layer and an upper catalyst layer. NO (nitrogen monoxide) in the exhaust gas is oxidized into $NO_2$ by the oxidation capability of the lower catalyst layer, and the resultant $NO_2$ is used for reduction of NOx by the upper catalyst layer. If the temperature of the NOx catalyst rises and the oxidation capability of its lower layer becomes high, ammonia, which is intended to serve as a reducing agent for reduction of NOx, may be oxidized unwontedly, leading to an increase in the amount of NOx (including $NO_2$) produced. Then, there is a possibility that the NOx removal rate with the NOx catalyst may be deteriorated.

It is difficult for the NOx catalyst having the above-described layered structure to exercise satisfactory NOx removal capability as an NOx catalyst unless reducing agent for reducing NOx is delivered in an appropriate manner suitable for the capabilities of the respective layers, such as the NOx reducing capability and the oxidation capability. The delivery of reducing agent to the NOx catalyst greatly relates to diffusion of exhaust gas in the NOx catalyst. The extent of diffusion of the exhaust gas containing the reducing agent in each layer of the NOx catalyst greatly depends on the flow speed of the exhaust gas. Therefore, it is difficult to enable the NOx catalyst to exercise the reducing capability sufficiently only by adding reducing agent for NOx reduction to the exhaust gas to add the reducing agent to the NOx catalyst without taking account of the effect of the flow speed on the NOx catalyst.

The present invention has been made in view of the above-described problem, and an object of the present invention is to provide a technology that enables the NOx catalyst to exercise its NOx reducing capability at any flow speed of the exhaust gas flowing into the NOx catalyst.

Solution to Problem

To solve the above problem, in the present invention, when reducing agent is added to inflowing exhaust gas flowing into a selective catalytic reduction NOx catalyst including a first catalyst layer having capability of reducing NOx and a second catalyst layer having oxidation capability, the concentration of the reducing agent in the reducing agent atmosphere during the addition period is adjusted taking account of the flow speed of the inflowing exhaust gas. The concentration of the reducing agent (reducing agent concentration) in the reducing agent atmosphere is defined as the proportion of the added reducing agent in the reducing agent atmosphere formed in the exhaust gas by addition of the reducing agent (i.e. the exhaust gas containing the reducing agent) per unit time. Thus, the reducing agent concentration can be calculated by dividing the quantity of the reducing agent added per unit time by the exhaust gas flow quantity per unit time. Controlling the reducing agent concentration in the reducing agent atmosphere during the reducing agent addition period changes the extent of diffusion of the added reducing agent in the selective catalytic reduction NOx catalyst. Therefore, controlling the reducing agent concentration can produce a state of delivery of the reducing agent in the selective catalytic reduction NOx catalyst that enables it to exercise its capability of reducing NOx appropriately.

More specifically, an exhaust gas purification apparatus for an internal combustion engine according to the present invention comprises: a selective catalytic reduction NOx catalyst having a catalyst substrate and catalyst layers made up of catalyst particles having the property of selectively reducing NOx with a reducing agent derived from ammonia arranged on the catalyst substrate, the catalyst layers including at least a first catalyst layer having capability of reducing NOx and a second catalyst layer having oxidation capability arranged closer to said catalyst substrate than said first catalyst layer; a supply valve for adding a specific addition quantity of reducing agent for reducing NOx to inflowing exhaust gas flowing into said selective catalytic reduction NOx catalyst; and a controller that is configured to control addition of the reducing agent by said supply valve based on the flow speed of said inflowing exhaust gas in such a way that the concentration of the reducing agent in a reducing agent atmosphere formed in said inflowing exhaust gas in a reducing agent addition period becomes equal to a specific concentration that is determined based on the flow speed of said inflowing exhaust gas and at which the reducing agent is assumed not to reach said second catalyst layer, when the temperature of the selective catalytic reduction NOx catalyst exceeds a specific temperature at which reduction of NOx by said first catalyst layer is carried out.

The selective catalytic reduction NOx catalyst (NOx catalyst) used in the exhaust gas purification apparatus for an internal combustion engine according to the present invention is made up of a catalyst substrate and a plurality of catalyst layers arranged on the catalyst substrate, which include at least the aforementioned first catalyst layer and the aforementioned second catalyst layer. The present invention does not exclude the inclusion of a catalyst layer(s) other than the first catalyst layer and the second catalyst layer in the aforementioned NOx catalyst. Since the second catalyst layer is located on the catalyst substrate side of the first catalyst layer, the exhaust gas flows firstly into the first catalyst layer from outside the NOx catalyst and thereafter flows into the second catalyst layer. Since the second catalyst layer is located under the first catalyst layer if the catalyst substrate is regarded as the base, the position of the second catalyst layer relative to the first catalyst layer will be described as "lower", and conversely the position of the first catalyst layer relative to the second catalyst layer will be described as "upper", in some cases in this specification.

While the first catalyst layer is a catalyst layer having capability of reducing NOx, the second catalyst layer is a catalyst layer having oxidation capability. The second catalyst layer may be a layer having capability of reducing NOx and further exercising oxidation capability depending on the catalyst temperature. The NOx catalyst having the first catalyst layer and the second catalyst layer can remove NOx in the exhaust gas by reduction by the first catalyst layer at least. Having oxidation capability, the second catalyst layer can oxidize NO (carbon monoxide) in the exhaust gas into $NO_2$ to supply it to the first catalyst layer, thereby promoting reduction of NOx by the first catalyst layer. The NOx catalyst may be designed, with the construction, as a catalyst arranged at the downstream end of the exhaust passage to prevent or reduce the emission of ammonia to the outside.

To enable reduction of NOx in the NOx catalyst, it is necessary for the temperature of the NOx catalyst to reach a specific temperature at which reduction of NOx by the first catalyst layer is carried out. When the temperature of the NOx catalyst reaches the specific temperature, the temperature of the second catalyst layer also substantially reaches the specific temperature. In this state, the oxidation capability exercised by the second catalyst layer is not negligible. Therefore, when the reducing agent is added to the exhaust gas by the supply valve for reduction of NOx in the NOx catalyst, if ammonia produced from the reducing agent reaches the second catalyst layer, NOx is produced by the oxidation capability of the second catalyst layer. Depending on the amount of NOx thus produced, reduction of NOx by the first catalyst layer can be insufficient, leading to a decrease in the NOx reduction rate of the NOx catalyst in some cases. To enhance the efficiency of NOx reduction by the NOx catalyst, it is preferred that ammonia produced from the reducing agent be supplied to the NOx catalyst in such a way that it does not reach the second catalyst layer.

The extent of diffusion of ammonia in the NOx catalyst is not always constant, but it greatly depends on the flow speed of the inflowing exhaust gas flowing into the NOx catalyst. Specifically, if the concentration of the reducing agent in the reducing agent atmosphere formed by addition of the reducing agent to the exhaust gas by the supply valve is the same, the lower the flow speed of the inflowing exhaust gas is, the longer the time over which the reducing agent atmosphere stays in the NOx catalyst is, and the more the reducing agent atmosphere is likely to reach the second layer, which is arranged as the lower layer in the NOx catalyst. The ammonia in the reducing agent atmosphere that reaches the second catalyst layer is converted into NOx by the oxidation capability of the second catalyst layer.

In the exhaust gas purification apparatus according to the present invention, when the temperature of the selective catalytic reduction NOx catalyst exceeds a specific temperature at which reduction of NOx by said first catalyst layer is carried out, the controller controls addition of the reducing agent by said supply valve based on the flow speed of said inflowing exhaust gas in such a way that the concentration of the reducing agent in the reducing agent atmosphere formed in said inflowing exhaust gas in the reducing agent addition period becomes equal to a specific concentration that is determined based on the flow speed of said inflowing exhaust gas and at which the reducing agent is assumed not to reach said second catalyst layer. Thus, the aforementioned relationship between the extent of diffusion of the reducing agent atmosphere in the NOx catalyst and the flow speed of the inflowing exhaust gas is taken into account, and when the temperature of the NOx catalyst exceeds the specific temperature, addition of the reducing agent by the supply valve is controlled based on the flow speed of the inflowing exhaust gas in such a way that the concentration of the reducing agent in the reducing agent atmosphere becomes equal to the specific concentration. In the exhaust gas purification apparatus according to the present invention, the reducing agent atmosphere is formed by adding a specific addition quantity of reducing agent by the supply valve. The specific addition quantity is the quantity of reducing agent added in the reducing agent addition period, namely the quantity of reducing agent added in the reducing agent addition period for reduction of NOx by the NOx catalyst. The specific addition quantity is determined taking account of conditions concerning reduction of NOx by the NOx catalyst, such as the quantity of ammonia adsorbed in the NOx catalyst and the NOx concentration in the exhaust gas.

As above, when the temperature of the NOx catalyst exceeds the specific temperature, the concentration of the reducing agent in the reducing agent atmosphere formed by addition of the reducing agent is made equal to the specific concentration. Thus, it is possible to control the extent of diffusion of the reducing agent atmosphere in the NOx catalyst in such way as to prevent ammonia contained in the reducing agent atmosphere from reaching the second catalyst layer, whatever the flow speed of the inflowing exhaust gas is at the time when the reducing agent is added by the supply valve. In consequence, generation of NOx by the second catalyst layer can be prevented while effectively promoting reduction of NOx by the first catalyst layer, and therefore the NOx catalyst can exercise its NOx reduction capability at any exhaust gas flow speed. The specific concentration may be either a fixed value or a variable value that is varied depending on the exhaust gas flow speed.

In the above-described exhaust gas purification apparatus for an internal combustion engine, when the temperature of the selective catalytic reduction NOx catalyst exceeds said specific temperature, said controller may control addition of the reducing agent by said supply valve based on the flow speed of said inflowing exhaust gas in such a way that the concentration of the reducing agent in the reducing agent atmosphere formed in said inflowing exhaust gas becomes equal to said specific concentration that is set lower when the flow speed of said inflowing exhaust gas is low than when the flow speed of said inflowing exhaust gas is high, provided that said specific addition quantity is the same, namely provided that the specific addition quantity added in said reducing agent addition period is the same. In other words, when the exhaust gas flow speed is low (or in the "low flow speed state"), the controller may control addition of the reducing agent in such a way as to form a reducing agent atmosphere having the aforementioned specific concentration that is set lower when the exhaust gas flow speed is low than when the exhaust gas flow speed is high (or in the "high flow speed state") in the exhaust gas flowing into the NOx catalyst, without changing the quantity of the reducing agent added to the exhaust gas.

As above, in the low flow speed state, the controller forms a reducing agent atmosphere having a concentration lower than that in the high flow speed state. Since the concentration of the reducing agent in this reducing agent atmosphere is relatively low, even though the reducing agent atmosphere enters the NOx catalyst from the first catalyst layer side at low flow speed, ammonia contained in the reducing agent atmosphere is not apt to reach the second catalyst layer, which is arranged on the catalyst substrate side (or lower side). Consequently, in the low speed state, the reducing agent is unlikely to reach the second catalyst layer. Therefore, the NOx reduction efficiency of the NOx catalyst can be kept high, whatever the exhaust gas flow speed is. In forming this reducing agent atmosphere, the quantity of the reducing agent is not increased or decreased, and therefore an appropriate quantity of reducing agent can be supplied to the first catalyst layer for reduction of NOx.

In the above-described exhaust gas purification apparatus for an internal combustion engine, as said specific addition quantity of reducing agent is added to the exhaust gas by said supply valve, the reducing agent concentration in said reducing agent atmosphere may change with time to eventually reach said specific concentration, and the difference between the highest value and the lowest value of the reducing agent concentration in said reducing agent atmosphere in the case where the flow speed of said inflowing exhaust gas is low may be smaller than the difference between the highest value and the lowest value of the reducing agent concentration in said reducing agent atmosphere in the case where the flow speed of said inflowing exhaust gas is high. By making the difference between the highest value and the lowest value of the reducing agent concentration in the reducing agent atmosphere smaller in the low flow speed state, the concentration of the reducing agent atmosphere formed in the exhaust gas is made smaller. In consequence, it is possible to enhance the NOx reduction efficiency of the NOx catalyst, whatever the exhaust gas flow rate is.

In the case where the reducing agent concentration in said reducing agent atmosphere changes with time to eventually reach said specific concentration as said specific addition quantity of reducing agent is added to the exhaust gas by said supply valve, the peak value of the reducing agent concentration in said reducing agent atmosphere in the case where the flow speed of said inflowing exhaust gas is low may be lower than the peak value of the reducing agent concentration in said reducing agent atmosphere in the case where the flow speed of said inflowing exhaust gas is high. By making the peak value of the reducing agent concentration in the reducing agent atmosphere smaller in the low flow speed state, the concentration of the reducing agent atmosphere formed in the exhaust gas is made smaller, whereby reducing agent can be prevented from reaching the second catalyst layer.

In the above-described exhaust gas purification apparatus for an internal combustion engine, said first catalyst layer may be a catalyst layer that has high NOx reduction capability at high temperatures (which will be sometimes referred to as the "high-temperature catalyst layer" hereinafter), and the second catalyst layer may be a catalyst layer having high NOx reduction capability at low temperatures (which will be sometimes referred to as the "low-temperature catalyst layer"). Said second catalyst layer has higher capability of oxidizing said reducing agent when the temperature of said selective catalytic reduction NOx catalyst is higher than said specific temperature than when the temperature of said selective catalytic reduction NOx catalyst is not higher than said specific temperature. In the case where the NOx catalyst includes a plurality of catalyst layers having NOx reduction capability as above, it is possible to enhance the NOx reduction efficiency of the NOx catalyst by adjusting the reducing agent concentration in the reducing agent atmosphere to the specific concentration based on the flow speed of the inflowing exhaust gas as described above, whatever the exhaust gas flow speed is.

In the above-described exhaust gas purification apparatus for an internal combustion engine, the low-temperature catalyst layer may contain catalyst particles produced by ion-exchanging crystalline zeolite with Cu, and the high-temperature catalyst layer may contain catalyst particles produced by ion-exchanging crystalline zeolite with Fe. Alternatively, the low-temperature catalyst layer may contain catalyst particles composed of SnMnCeOx, which is a manganese oxide. In this case, the high-temperature catalyst layer may contain catalyst particles produced by ion-exchanging crystalline zeolite with Fe, similarly. In the above case, Sn and Ce are added in order to improve the durability of the NOx catalyst. Therefore, the term "manganese oxide" in the context of the present invention denotes manganese oxides to which a component(s) other than Sn and Ce is added for the purpose of improving the durability or other purposes and manganese oxides to which other components are not added. The present invention does not exclude low-temperature catalyst layers and high-temperature catalyst layers containing catalyst particle other than those mentioned above.

The exhaust gas purification apparatus for an internal combustion engine described in the foregoing may further comprise a determiner that is configured to determine whether or not the reducing agent will reach said second catalyst layer when the temperature of said selective catalytic reduction NOx catalyst is higher than said specific temperature and a concentration decrease calculator that is configured to calculate an amount of decrease by which the concentration of the reducing agent in said inflowing exhaust gas is to be decreased by said controller when it is determined by said determiner that the reducing agent will reach said second catalyst layer. In this case, said controller controls addition of the reducing agent by said supply valve in accordance with said amount of decrease of the concentration of the reducing agent calculated by said concentration decrease calculator to make the concentration of the reducing agent in said inflowing exhaust gas equal to said specific concentration.

With the above feature, the reducing agent atmosphere having a specific concentration that is relatively low is formed by the controller in the case where it is determined by the determiner that the reducing agent will reach the low temperature catalyst layer. The determination by the determiner may be made based on a parameter correlating with the extent of diffusion of the reducing agent atmosphere in the NOx catalyst, such as the flow speed of the inflowing exhaust gas. Since the reducing agent atmosphere having a specific concentration is formed by the controller in accordance with the amount of decrease of the reducing agent concentration calculated by the concentration decrease calculator, the reducing agent atmosphere thus formed can have a specific concentration that prevents the reducing agent from reaching the second catalyst layer. The amount of decrease of the reducing agent concentration can be calculated taking account of the parameter correlating with the extent of diffusion of the reducing agent atmosphere in the NOx catalyst, which is used in the determination by the determiner.

The exhaust gas purification apparatus having the above-described concentration decrease calculator may further comprise a concentration increase calculator that is configured to calculate an amount of increase by which the concentration of the reducing agent in said inflowing exhaust gas can be increased by said controller within the limits of not causing the reducing agent to reach said second catalyst layer when it is determined by said determiner that the reducing agent will not reach said second catalyst layer. In this case, said controller controls addition of the reducing agent by said supply valve in accordance with said amount of increase of the concentration of the reducing agent calculated by said concentration increase calculator. When the reducing agent is supplied to the NOx catalyst, the higher the reducing agent concentration in the reducing agent atmosphere is, the more the reducing agent is apt to be delivered to the deep part of the first catalyst layer, and the more effectively NOx is expected to be reduced in the first catalyst layer. On the other hand, the higher the reducing agent concentration is, the more the reducing agent atmosphere is apt to reach the second catalyst layer. In view of the above, when it is determined that the reducing agent will not reach the second catalyst layer, the controller is adapted to increase the reducing agent concentration according to the amount of increase calculated by the concentration increase calculator within the limits of not causing the reducing agent to reach the second catalyst layer. Thus, reduction of NOx in the first catalyst layer can be achieved effectively while preventing or controlling oxidation of the reducing agent by the second catalyst layer. The aforementioned amount of increase of the reducing agent concentration can be calculated taking account of the parameter correlating with the extent of diffusion of the reducing agent atmosphere in the NOx catalyst, which is used in the determination by the determiner.

In the exhaust gas purification apparatus for an internal combustion engine described in the foregoing, when adding said specific addition quantity of reducing agent to the exhaust gas, said controller may make the concentration of the reducing agent in said inflowing exhaust gas lower by decreasing the quantity of reducing agent added by said supply valve per unit time and increasing a supply valve open time of said supply valve. Alternatively, said specific addition quantity of reducing agent may be added to the exhaust gas in a manner in which addition of the reducing agent and suspension of addition are alternated, and said controller may make the concentration of the reducing agent in said inflowing exhaust gas lower by making the interval between successive additions of the reducing agent longer. In any case, the exhaust gas purification apparatus according to the present invention can prevent the reducing agent from reaching the second catalyst layer by controlling addition of the reducing agent by the controller under the condition that specific addition quantity is not changed, whatever the exhaust gas flow speed is.

Advantageous Effects of Invention

The present invention enables the NOx catalyst to exercise its NOx reducing capability at any flow speed of the exhaust gas flowing into the NOx catalyst.

BRIEF DESCRIPTION OF DRAWINGS

FIG. 1A is a diagram showing an exhaust gas purification apparatus for an internal combustion engine that uses a selective catalytic reduction NOx catalyst including two catalyst layers.

FIG. 1B is a diagram showing the structure of the selective catalytic reduction NOx catalyst used in the exhaust gas purification apparatus shown in FIG. 1A.

FIG. 2 is a graph showing relationship between the catalyst temperature and the capability of selectively reducing NOx for Cu and Fe as active components in the selective catalytic reduction NOx catalyst.

FIG. 3 illustrates relationship between a first mode of urea solution addition performed in the exhaust gas purification apparatus for an internal combustion engine according to the present invention and the state of diffusion of ammonia as reducing agent used with the selective catalytic reduction NOx catalyst.

FIG. 4A is a graph showing relationship between the supply valve open time in addition of urea solution performed in the exhaust gas purification apparatus for an internal combustion engine according to the present invention and the flow speed of the exhaust gas flowing into the selective catalytic reduction NOx catalyst.

FIG. 4B is a graph showing the change with time of the reducing agent concentration in the reducing agent atmosphere formed in the exhaust gas flowing into the selective catalytic reduction NOx catalyst in a case where addition of urea solution according to the present invention is performed.

FIG. 5 is a flow chart of NOx removal control performed in the exhaust gas purification apparatus for an internal combustion engine according to the present invention.

FIG. 6 is a first diagram showing a control map used in the NOx removal control shown in FIG. 5 to determine whether or not ammonia will reach the second catalyst layer and a control map used in the NOx removal control shown in FIG. 5 to determine a supply valve open time for preventing ammonia from reaching the second catalyst layer.

FIG. 7 is a second diagram showing a control map used in the NOx removal control shown in FIG. 5 to determine whether or not ammonia will reach the second catalyst layer and a control map used in the NOx removal control shown in FIG. 5 to determine a supply valve open time for preventing ammonia from reaching the second catalyst layer.

FIG. 8A is a diagram schematically showing a second mode of addition of urea solution performed in the exhaust gas purification apparatus for an internal combustion engine according to the present invention.

FIG. 8B is a diagram schematically showing a third mode of addition of urea solution performed in the exhaust gas purification apparatus for an internal combustion engine according to the present invention.

FIG. 8C is a diagram schematically showing a fourth mode of addition of urea solution performed in the exhaust gas purification apparatus for an internal combustion engine according to the present invention.

FIG. 8D is a diagram schematically showing a fifth mode of addition of urea solution performed in the exhaust gas purification apparatus for an internal combustion engine according to the present invention.

FIG. 9 is a diagram showing another selective catalytic reduction NOx catalyst including two catalyst layers, which can be used in the exhaust gas purification apparatus for an internal combustion engine according to the present invention.

DESCRIPTION OF EXAMPLES

In the following, specific examples of the present invention will be described with reference to the drawings. The dimensions, materials, shapes, relative arrangements, and other features of the components that will be described in connection with the examples are not intended to limit the technical scope of the present invention only to them, unless particularly stated.

First Example

An example of a catalyst for selective catalytic reduction of NOx (which will be sometimes simply referred to as "NOx catalyst" hereinafter) according to the present invention will be described with reference to the accompanying drawings. FIG. 1A shows an exhaust gas purification apparatus of an internal combustion engine 1 provided with an NOx catalyst 3. The internal combustion engine 1 shown in FIG. 1A is a diesel engine for driving a vehicle. The internal combustion engine 1 is not limited to a diesel engine, but it may be other types of engine such as a gasoline engine. In FIG. 1A, some components of the internal combustion engine 1 such as an EGR apparatus for recirculation of a part of the exhaust gas flowing in the exhaust passage 2 to the intake system are not shown.

In the exhaust passage 2 of the internal combustion engine 1, there is provided an NOx catalyst 3 that selectively reduces NOx in the exhaust gas using ammonia as a reducing agent. In order to produce ammonia serving as a reducing agent in the NOx catalyst 3, urea solution (aqueous urea solution) as a precursor of ammonia is stored in a urea tank 4. The urea solution is added to the exhaust gas by a supply valve 5 arranged upstream of the NOx catalyst 3. The urea solution added through the supply valve 5 is hydrolyzed by the effect of heat of the exhaust gas to produce ammonia. The ammonia thus produced flows into the NOx catalyst 3 and is adsorbed by the NOx catalyst 3. Consequently, reduction reaction of the adsorbed ammonia and NOx in the exhaust gas occurs. Thus, NOx is removed by reduction. In this example, urea solution is added through the supply valve 5 as described above. Alternatively, ammonia or ammonia solution may be added directly into the exhaust gas. Moreover, an ASC catalyst may be provided downstream of the NOx catalyst 3. The ASC catalyst is an oxidation catalyst adapted to oxidize ammonia slipping through the NOx catalyst 3.

The NOx catalyst 3 is produced by applying a slurry containing catalyst particles to a catalyst substrate 33 and thereafter drying and sintering it. Specifically, as shown in FIG. 1B, the NOx catalyst 3 has a first catalyst layer 31 and a second catalyst layer 32. The second catalyst layer 32 is arranged adjacent to the catalyst substrate 33, and the first catalyst layer 31 is arranged close to the exhaust gas flow in the exhaust passage 2. Thus, the second catalyst layer 32 is arranged between the first catalyst layer 31 and the catalyst substrate 33, and NOx in the exhaust gas enters the first catalyst layer 31 and diffuses through it to reach the second catalyst layer 32. The above-described multilayer coating structure of the NOx catalyst produced by coating a catalyst substrate with a plurality of catalyst layers has already been known, and details of its manufacturing process will not be described in this specification.

Now we will describe the catalyst particles that constitute the first catalyst layer 31. The catalyst particles are produced by partly ion-exchanging crystalline zeolite with Fe (iron), which is an active component having the property of selectively reducing NOx in the exhaust gas. The catalyst particles are bound by a binder to constitute the first catalyst layer 31. The exhaust gas flows into the first catalyst layer 31 as such, and NOx in the exhaust gas diffuses in micropores of the zeolite in the first catalyst layer 31 together with ammonia as reducing agent, so that reduction reaction of NOx occurs.

In this example, Fe is used in the first catalyst layer 31 of the NOx catalyst 3 as an active component having the property of selectively reducing NOx as described above. The NOx catalyst produced by ion-exchanging the crystalline zeolite with Fe (which will be hereinafter referred to as "Fe-exchanged NOx catalyst") tends to have high NOx removing capability at relatively high temperatures (e.g. in the temperature range above 400° C.) as shown by line L1 in FIG. 2. On the other hand, the active component having the property of selectively reducing NOx used in the second catalyst layer 32 of the NOx catalyst 3 is Cu, which is another active component having the property of selectively reducing NOx. The NOx catalyst produced by ion-exchanging crystalline zeolite with Cu (which will be hereinafter referred to as "CU-exchanged NOx catalyst") tends to have high NOx removing capability at relatively low temperatures (e.g. in the temperature range between 230° C. and 400° C.) as shown by line L2 in FIG. 2. The Cu-exchanged NOx catalyst is known to have higher oxidation capability than the Fe-exchanged NOx catalyst. Therefore, at high temperatures, the Cu-exchanged NOx catalyst exhibits high selectivity to the reaction of oxygen and the reducing agent, so that it tends to oxidize ammonia, which is intended to serve as reducing agent for reducing NOx, to produce NOx, and the NOx removal rate is deteriorated.

As above, the first catalyst layer 31 corresponds to the first catalyst layer according to the present invention, and the second catalyst layer 32, which has the capability of oxidizing ammonia, corresponds to the second catalyst layer according to the present invention. As the NOx catalyst 3 has the first catalyst layer 31 and the second catalyst layer 32 which are arranged one above the other as shown in FIG. 1B, the NOx catalyst can remove NOx by reducing it through a relatively large range of temperature of the NOx catalyst 3. Specifically, when the temperature of the NOx catalyst 3 is in a low temperature removal range T2, NOx is expected to be removed mainly utilizing the NOx reduction capability of the second catalyst layer 32. When the temperature of the NOx catalyst 3 is in a high temperature removal range T3, NOx is expected to be removed mainly utilizing the NOx reduction capability of the first catalyst layer 31. Since the first catalyst layer 31 is arranged above the second catalyst layer 32, when the temperature of the NOx catalyst 3 is in the high temperature removal range T3, it is preferred that ammonia in the exhaust gas be consumed by the first catalyst layer as much as possible so as to prevent ammonia from reaching the second catalyst layer 32, thereby avoiding conversion of ammonia into NOx. This will be described in detail later.

In the range T1 of the temperature of the NOx catalyst 3 below the low temperature removal range T2, the NOx catalyst 3 is not sufficiently active, and removal of NOx by reduction cannot be expected. This range T1 will be referred to as the inactive range. In the temperature range T4 above the high temperature removal range T3, the NOx removal rate of the first catalyst layer 31 deteriorates due to high temperature. Therefore, this temperature range T4 will be referred to as the excessively high temperature range. In the inactive range T1 and the excessively high temperature range T4, removal of NOx by reduction by the NOx catalyst 3 cannot be expected, and therefore addition of urea solution through the supply valve 5 is basically suspended.

An NOx sensor 10 that measures the NOx concentration in the exhaust gas flowing into the NOx catalyst 3 is provided upstream of the NOx catalyst 3. Another NOx sensor 11 that measures the NOx concentration in the exhaust gas flowing out of the NOx catalyst 3 is provided downstream of the NOx catalyst 3. Moreover, a temperature sensor 14 that measures the temperature of the exhaust gas flowing out of the NOx catalyst 3 is provided downstream of the NOx catalyst 3. The internal combustion engine 1 is equipped with an electronic control unit (ECU) 20, which is a unit that controls the operation state of the internal combustion engine 1 and the exhaust gas purification apparatus. The ECU 20 is electrically connected with various sensors, such as the NOx sensors 10, 11 and the temperature sensor 14 described above, a crank position sensor 21, an accelerator opening degree sensor 22, and an air flow meter 26 provided in the intake passage 25 of the internal combustion engine 1. Measurement values of the sensors are entered into the ECU 20. Thus, the ECU 20 can recognize parameters concerning the operation state of the internal combustion engine 1, such as the intake air quantity based on the measurement value of the air flow meter 26, the exhaust gas flow rate calculated based on the intake air quantity, the engine speed based on the measurement value of the crank position sensor 21, and the engine load based on the measurement value of the accelerator opening degree sensor 22.

In this example, the concentration of NOx in the exhaust gas flowing into the NOx catalyst 3 can be measured by the NOx sensor 10. Alternatively, it can be estimated based on the operation state of the internal combustion engine 1, because the concentration of NOx in the exhaust gas discharged from the internal combustion engine 1 (that is, the exhaust gas before subjected to purification by the NOx catalyst 3 or the exhaust gas flowing into the NOx catalyst 3) has correlation with the operation state of the internal combustion engine 1.

The ECU 20 sends a command to the supply valve 5 taking account of the NOx concentration in the exhaust gas thus measured or estimated, so that a quantity of urea solution needed to remove NOx by reduction is added to the exhaust gas. For example, the quantity of urea solution to be added through the supply valve 5 may be determined in such a way as to keep the actual NOx removal rate with the NOx catalyst 3 determined by the following equation (1) within a predetermined range that is appropriately determined to meet requirements in exhaust gas purification. Alternatively, the quantity of urea solution to be added through the supply valve 5 may be determined based on the estimated amount of ammonia adsorbed in the NOx catalyst.

(NOx removal rate)=1−(measurement value of NOx sensor 11)/(measurement value of NOx sensor 10)    (equation 1)

In the NOx catalyst 3, the first catalyst layer 31 having relatively high NOx reducing capability at high temperatures is arranged above, as described above. When the temperature of the NOx catalyst 3 is in the high temperature removal range T3 in which removal of NOx by the first catalyst layer 31 is carried out, the second catalyst layer 32 located below the first catalyst layer 31 exhibits high capability of oxidizing ammonia. In view of this, when the temperature of the NOx catalyst 3 is in the high temperature removal range T3, it is necessary in order to enhance the NOx reduction efficiency of the NOx catalyst 3 to prevent or control delivery of ammonia to the second catalyst layer 32 while supplying ammonia as reducing agent to the first catalyst layer 31. Thus, in order to ensure an appropriate NOx reduction efficiency of the NOx catalyst 3, it is necessary to appropriately control the diffusion of the reducing agent atmosphere in the NOx catalyst having multiple catalyst layers.

The NOx catalyst 3 is arranged in such a way that the exhaust gas flowing in the exhaust passage 2 flows into it. The reducing agent atmosphere formed in the exhaust gas by addition of urea solution to the exhaust gas through the supply valve 5 flows into the NOx catalyst 3 together with the exhaust gas. Therefore, the diffusion of the reducing agent atmosphere in the NOx catalyst 3 is greatly affected by the flow speed of the exhaust gas flowing into the NOx catalyst 3 (which will be simply referred to as "inflowing exhaust gas" hereinafter). Specifically, if the concentration of the reducing agent (i.e. the concentration of ammonia) in the reducing agent atmosphere is the same, the higher the flow speed of the inflowing exhaust gas is, the less the reducing agent is apt to diffuse in the lamination direction of the catalyst layers in the NOx catalyst 3, and the more the reducing agent is apt to diffuse in the direction of the exhaust gas flow. In other words, if the concentration of the reducing agent in the reducing agent atmosphere is the same, the lower the flow speed of the inflowing exhaust gas is, the more the reducing agent is apt to diffuse in the lamination direction of the catalyst layers in the NOx catalyst 3, and the less the reducing agent is apt to diffuse in the direction of the exhaust gas flow.

In view of the above, the exhaust gas purification apparatus according to the present invention is adapted to control the mode of addition of urea solution through the supply valve 5 taking account of the flow speed of the inflowing exhaust gas flowing into the NOx catalyst 3 to achieve appropriate diffusion of the reducing agent atmosphere in the NOx catalyst 3, when the temperature of the NOx catalyst 3 is in the high temperature removal range T3. In the following, addition of urea solution in the case where the temperature of the NOx catalyst 3 is in the high temperature removal range T3 will be described briefly with reference to FIG. 3. The upper graph (a) in FIG. 3 schematically shows relationship between the supply valve open time of the supply valve 5 (i.e. the duration of the time through which the supply valve 5 is open to eject urea solution into the exhaust gas) and the concentration of ammonia in the reducing agent atmosphere formed in the exhaust gas by the addition of urea solution (namely, the reducing agent atmosphere flowing into the NOx catalyst 3) in the case where a specific quantity of urea solution is added through the supply valve 5 in order to remove NOx by reduction. This relationship will be hereinafter referred to as "concentration relationship". The addition of urea solution over the supply valve open time is performed repeatedly in a predetermined addition period. This means that the predetermined addition period includes a period during which addition of urea solution is not performed in addition to the aforementioned supply valve open time during which addition of urea solution is being performed (see FIG. 4B mentioned later). The lower diagram (b) in FIG. 3 schematically illustrates states of diffusion of the reducing agent (ammonia) in the NOx catalyst 3. The concentration of ammonia in the reducing agent atmosphere is calculated by dividing the quantity of ammonia produced per unit time by the exhaust gas flow rate per unit time.

In the upper graph (a) in FIGS. 3, L3 and L4 represent concentration relationships in the case where the same specific addition quantity of urea solution is added to the exhaust gas through the supply valve 5. Specifically, L3 represents a concentration relationship according to a standard diffusion model, and L4 represents a concentration relationship according to the present invention. The standard diffusion model is an ordinary model of diffusion that does not taking into account the flow speed of the inflowing exhaust gas. In this standard diffusion model, the reducing agent atmosphere is assumed to diffuse from the upper layer side of the NOx catalyst 3 gradually to the lower layer side. Although the flow speed of the exhaust gas is not taken into account in the standard model, the actual diffusion of the reducing agent atmosphere in the NOx catalyst 3 can be greatly affected by the flow speed of the exhaust gas. For instance, when the flow speed of the exhaust gas is relatively low, the reducing agent is apt to diffuse in the lamination direction of the catalyst layers in the NOx catalyst 3 as described above, and the reducing agent tends to diffuse extensively in the lamination direction as illustrated by a hatched area R1 in FIG. 3B. In some cases, a portion of the reducing agent atmosphere reaches the second catalyst layer 32 to be subject to the oxidation capability of the second catalyst layer 32. As above, in the standard diffusion model, the supply valve open time $\Delta f1$ in addition the reducing agent is determined based on parameters that do not relate to the flow speed of the inflowing exhaust gas, which affects the extent of diffusion of the reducing agent atmosphere.

In the present invention, when the temperature of the NOx catalyst 3 is in the high temperature removal range T3, addition of urea solution for preventing ammonia from reaching the second catalyst layer 32 is performed. Given the fact that the reducing agent atmosphere is apt to diffuse in the lamination direction of the catalyst layers when the flow speed of the inflowing exhaust gas is relatively low, addition of urea solution is performed with the reducing agent concentration in the reducing agent atmosphere being reduced so that the reducing agent atmosphere does not reach the second catalyst layer 32. Specifically, addition of urea solution is performed with lowered ejection pressure of the supply valve 5 so that the same quantity of urea solution is added to the exhaust gas over a supply valve open time $\Delta f2$ longer than the supply valve open time $\Delta f1$ in the case where the standard diffusion model is adopted. The supply valve open time $\Delta f2$ in this case is determined taking account of the flow speed of the inflowing exhaust gas. Consequently, the concentration of ammonia in the reducing agent atmosphere in the exhaust gas flowing into the NOx catalyst 3 is lower than the concentration of ammonia in the case where the standard diffusion model is used, as shown by L4 in graph(a) in FIG. 3. Thus, according to the present invention, when the temperature of the NOx catalyst 3 is in the high temperature removal range T3 and the flow speed of the inflowing exhaust gas is such that the reducing agent atmosphere can reach the second catalyst layer 32, a reducing agent atmosphere in which ammonia is distributed at low concentration is formed in the inflowing exhaust gas. In consequence, as illustrated by the hatched area R2 in diagram (b) in FIG. 3, the ammonia supplied to the NOx catalyst 3 is less apt to diffuse in the lamination direction of the catalyst layers in the NOx catalyst 3 than in the case illustrated by the area R1, and the ammonia tends to diffuse in the direction of the exhaust gas flow accordingly. In this way, even when the flow speed of the inflowing exhaust gas is low, it is possible to prevent the reducing agent atmosphere from reaching the second catalyst layer 32 and to supply the reducing agent efficiently for the NOx reduction reaction by the first catalyst layer 31. The model of diffusion of ammonia in the NOx catalyst 3 according to the present invention that takes into account the flow speed of the inflowing exhaust gas will be referred to as the diffusion model taking account of the flow speed.

If addition of urea solution is performed based on the standard diffusion model when the flow speed of the inflowing exhaust gas is relatively high, the reducing agent atmosphere tends not to diffuse in the lamination direction of the catalyst layers but to diffuse in the direction of exhaust gas flow, as illustrated by a hatched area R3 in diagram (b) in FIG. 3. Given this fact, in the present invention, which is based on the diffusion model taking account of the flow speed, addition of urea solution for increasing the reducing agent concentration in the reducing agent atmosphere may be performed when the flow speed of the inflowing exhaust gas is relatively high, so long as the reducing agent atmosphere does not reach the second catalyst layer 32. When the flow speed of the inflowing exhaust gas is high, while the reducing agent atmosphere tends to be prevented from reaching the second catalyst layer 32, the extent of diffusion of the reducing agent atmosphere in the NOx catalyst 3 increases. Consequently, the concentration of ammonia at the site of adsorption of ammonia becomes low, making it difficult to enhance the NOx reduction reaction. In such cases, the supply valve open time for adding the same quantity of urea solution to the exhaust gas is made shorter, to an extent that does not allow the reducing agent to reach the second catalyst layer 32, than the supply valve open time that is set in the case where the standard diffusion model is used, thereby increasing the reducing agent concentration in the reducing agent atmosphere. Thus, the reducing agent atmosphere, which may otherwise diffuse in the manner illustrated by the hatched area R3 in diagram (b) in FIG. 3, can be caused to diffuse in the manner illustrated by the hatched area R2.

Now, we will briefly describe addition of urea solution taking account of the flow speed of the exhaust gas flowing into the NOx catalyst 3 with reference to FIG. 4A. The upper graph (a) and the lower graph (b) in FIG. 4A show a relationship between the flow speed of the inflowing exhaust gas with the supply valve open time of the supply valve 5 and a relationship between the flow speed of the inflowing exhaust gas and the ammonia concentration in the reducing agent atmosphere respectively, in the case where a specific quantity of urea solution is added through the supply valve 5, as with FIG. 3. In the graphs (a) and (b), lines L5 represent the relationships in the case where the standard diffusion model is used and lines L6 represent relationships in the case where the present invention is applied.

In the case where the standard diffusion model is used, the supply valve open time is determined by a predetermined method that does not take account of the flow speed of the inflowing exhaust gas, as described above. Therefore, in the relationship shown in graph (a) in FIG. 4A, the supply valve open time is constant irrespective of the flow speed of the inflowing exhaust gas. Since the higher the flow speed of the inflowing exhaust gas is, the more the added reducing agent is diluted, the flow speed of the inflowing exhaust gas and the reducing agent concentration are in the relationship represented by line L5 in graph (b) in FIG. 4A.

In the case where the present invention is applied, when the temperature of the NOx catalyst 3 is in the high temperature removal range T3, the supply valve open time is set longer than the supply valve open time that is set in the case where the standard diffusion model is used when the flow speed of the inflowing exhaust gas is relatively low and shorter than the supply valve open time that is set in the case where the standard diffusion model is used when the flow speed of the inflowing exhaust gas is relatively high, as described above (see graph (a) in FIG. 4A). Consequently, the ammonia concentration in the reducing agent atmosphere formed in the exhaust gas is lower than that in the case where the standard diffusion model is used if the flow speed of the inflowing exhaust gas is relatively low and higher than that in the case where the standard diffusion model is used if the flow speed of the inflowing exhaust gas is relatively high, as shown in graph (b) in FIG. 4A. In graph (b) in FIG. 4A, lines L6 and L6' represent relationship in the case where the present invention is applied. In the case of the relationship represented by line L6, the reducing agent concentration decreases with increasing flow speed of the inflowing exhaust gas, as in the case of the relationship represented by line L5. In the case of the relationship represented by L6', the reducing agent concentration increases with increasing flow speed of the inflowing exhaust gas. Although the relationships represented by lines L6 and L6' show different tendencies, they show the same tendency relative to the relationship represented by L5, as described above. Thus, the relationships represented by lines L6 and L6' are both based on the present invention.

When the temperature of the NOx catalyst 3 is in the low temperature removal range T2, the supply valve open time is set based on the standard diffusion model.

Now, we will specifically describe the change of the ammonia concentration with time in cases where addition of reducing agent represented by line L6 or L6' in FIG. 4A (i.e. addition of reducing agent according to the present invention) is performed. FIG. 4B shows the change with time of the ammonia concentration in the reducing agent atmosphere formed in the exhaust gas in the case where addition of reducing agent according to the present invention is performed. Specifically, the upper graph (a) shows the change of the ammonia concentration with time in a case where the flow speed of the inflowing exhaust gas is relatively low (low flow speed state), and the lower graph (b) shows the change of the ammonia concentration with time in a case where the flow speed of the inflowing exhaust gas is relatively high (high flow speed state). In the low flow speed state, the supply valve open time is set relatively longer as shown by line L6 or L6' in FIG. 4A, when the quantity of the reducing agent added is the same specific addition quantity. This makes the magnitude of change of the ammonia concentration in the reducing agent atmosphere (i.e. the difference between the peak value d1 of the concentration and the lowest value d0 of the concentration) smaller than the magnitude of change of the ammonia concentration in the high flow speed state (i.e. the difference between the peak value d3 of the concentration and the lowest value d2 of the concentration). Moreover, the peak value d1 of the concentration in the low flow speed state is lower than the peak value of the concentration in the high flow speed state. The reason why the change of the ammonia concentration in the reducing agent atmosphere in the exhaust gas with time differs between the low flow speed state and the high flow speed state while the same specific addition quantity of urea solution is added is that, in the present invention, addition of reducing agent is performed taking account of the change in the extent of diffusion of ammonia in the NOx catalyst 3 depending on the exhaust gas flow speed as described above.

As described above, when the present invention is applied, provided that the same specific supplied quantity of urea solution is added, the supply valve open time is made longer when the flow speed of the inflowing exhaust gas is low than when the flow speed of the inflowing exhaust gas is high. Consequently, the concentration of ammonia in the reducing agent atmosphere supplied to the NOx catalyst 3 is made lower when the flow speed of the inflowing exhaust gas is low, so that the concentration of ammonia is adjusted to a specific concentration that will not cause the reducing agent atmosphere to reach the second catalyst layer 32. In consequence, the extent of diffusion of ammonia in the NOx catalyst 3 can be controlled as shown by area R2 in diagram (b) in FIG. 3. Thus, effective reduction of NOx by the first catalyst layer 31 and prevention of oxidation of ammonia by the second catalyst layer 32 can both be achieved.

With the above in mind, we will describe a control process for removing NOx (NOx removal control) performed in the exhaust gas purification apparatus of the internal combustion engine 1 shown in FIG. 1A with reference to FIG. 5. The NOx removal control is executed repeatedly by a control program stored in the ECU 20 to control addition of urea solution to the exhaust gas that is performed at a predetermined time to remove NOx. Firstly in step S101, the catalyst temperature Tc of the NOx catalyst 3 is acquired. Specifically, the catalyst temperature Tc of the NOx catalyst 3 is estimated using the measurement value of the temperature sensor 14. The catalyst temperature Tc can serve as a parameter used to determine to which catalyst layer the NOx reduction reaction occurring in the NOx catalyst 3 is mainly attributed, as shown in FIG. 2. After the completion of the processing of step S101, the process proceeds to step S102.

In step S102, a quantity of urea solution to be added through the supply valve 5 by this control is calculated. The quantity of urea solution to be added is determined, for example, in such a way that the NOx removal rate of the NOx catalyst 3 determined by the aforementioned equation 1 falls within a predetermined range. Thereafter, in step S103, it is determined whether or not the NOx catalyst 3 is active. Specifically, if the catalyst temperature Tc of the NOx catalyst 3 is in the inactive range T1, step S103 is answered in the negative, and otherwise, step S103 is answered in the affirmative. If an affirmative determination is made in step S103, the process proceeds to step S104, and if a negative determination is made, this control process is terminated.

In step S104, it is determined whether the catalyst temperature Tc of the NOx catalyst 3 is in the high temperature removal range T3. If an affirmative determination is made in step S104, the process proceeds to step S106, and if a negative determination is made, the process proceeds to step S105. In step S105, it is determined whether the catalyst temperature Tc of the NOx catalyst 3 is in the low temperature removal range T2. If an affirmative determination is made in step S105, the process proceeds to step S113, and if a negative determination is made, the process proceeds to step S115. As will be seen, the decision process in steps S104 and S105 is the process of determining in which range among the low temperature removal range T2, the high temperature removal range T3, and the excessively high temperature range T4 the catalyst temperature Tc of the NOx catalyst 3 falls.

Now, we will describe the processing starting from step S106 (or the processing of steps S106 to S112), which is executed when it is determined that the catalyst temperature Tc of the NOx catalyst 3 is in the high temperature removal range T3. In step S106, the flow speed of the inflowing exhaust gas (exhaust gas flow speed) is acquired based on the measurement value of the air flow meter 26. Then, in step S107, a provisional ammonia concentration in the reducing agent atmosphere formed in the inflowing exhaust gas is calculated based on the exhaust gas flow speed calculated in step S106. The provisional ammonia concentration is the ammonia concentration that will be reached if the supply valve open time of the supply valve 5 is provisionally set to a provisional supply valve open time that is calculated in accordance with the standard diffusion model. As the value of the provisional ammonia concentration, the peak value of the changing concentration shown in FIG. 4B is used. The reason why this peak value is used is that the extent of diffusion of the reducing agent atmosphere in the NOx catalyst 3 greatly depends on this peak value. Specifically, the relationship of the ammonia concentration reached with the quantity of ammonia produced from the aforementioned addition quantity of ammonia solution, the exhaust gas flow rate calculated from the exhaust gas flow speed, and the provisional supply valve open time is stored as a map in a memory of the ECU 20, and the provisional ammonia concentration is calculated by accessing the map. After the completion of the processing of step S107, the process proceeds to step S108.

In step S108, it is determined whether or not the ammonia produced from the urea solution added to the exhaust gas through the supply valve 5 will reach the second catalyst layer 32, which is the lower layer in the NOx catalyst 3. In making this determination, the flow speed is taken into account. In other words, the determination in step S108 is made using the diffusion model taking account of the flow speed. Specifically, the determination in step S108 is made based on a control map shown in the upper graph (a) in FIG. 6. In the control map shown in the upper graph (a) in FIG. 6, whether ammonia will reach the lower second catalyst layer 32 or not is mapped based on the relationship between the exhaust gas flow speed and the concentration of ammonia. This control map is stored in the memory in the ECU 20. The control map is prepared taking account of the fact that the lower the exhaust gas flow speed is, the more extensively ammonia is likely to diffuse in the lamination direction of the catalyst layers in the NOx catalyst 3. Therefore, in the control map shown in the upper graph (a) in FIG. 6, a region in which ammonia will not reach the lower second layer 32 extends in the lower part of the map, and a region in which ammonia will reach the lower second layer 32 extends in the upper part.

The determination in step S108 is made, for example, based on in which region among the regions in the control map a control point (represented by a filled circle in graph (a) in FIG. 6) is located. This control point is specified by the exhaust gas flow speed calculated in step S106 and the provisional ammonia concentration calculated in step S107. If an affirmative determination is made in step S108, the process proceeds to step S109, and if a negative determination is made, the process proceeds to step S111. In the illustrative case shown in graph (a) in FIG. 6, the control point is located in the region in which ammonia will reach the lower second catalyst layer 32. Therefore, a positive determination is made in the decision step of S108. Graph (a) in FIG. 7 shows a control map same as that in graph (a) in FIG. 6. The control point (represented by a filled circle) shown in graph (a) in FIG. 7 is located in the region in which ammonia will not reach the lower second catalyst layer 32. Therefore, in this case, a negative determination is made in the decision step of S108. Detailed description with FIG. 7 will be made later in connection with steps S111 and S112.

Then in step S109, it is calculated how much the concentration of ammonia in the reducing agent atmosphere is to be decreased according to the diffusion model taking account of the flow speed in order to prevent ammonia from reaching the lower second catalyst layer 32. Specifically, the amount of decrease of the concentration is calculated based on the control map shown in graph (a) in FIG. 6. For example, in the case where the aforementioned control point is located at the position of the filled circle in graph (a) in FIG. 6, in order to shift the control point to the region in which ammonia will not reach the lower second catalyst layer 32 (e.g. the position indicated by a hollow circle in graph (a) in FIG. 6) in the same exhaust gas flow speed condition, it is necessary to decrease the concentration of ammonia to X1 by an amount $\Delta X$ represented by a hollow arrow in graph (a) in FIG. 6. This amount of decrease of the concentration of ammonia is the amount of decrease of the concentration calculated in step S109, and the ammonia concentration X1 thus finally reached is the "specific concentration" mentioned in the context of the present invention.

In step S109, moreover, the supply valve open time for adding urea solution through the supply valve 5 to achieve the aforementioned decrease of the ammonia concentration is also determined. Specifically, the supply valve open time is determined using a control map shown in graph (b) in FIG. 6. The control map shown in graph (b) in FIG. 6 defines relationship between the supply valve open time through which a specific addition quantity of urea solution is added and the ammonia concentration at a certain exhaust gas flow speed. A control map specifying the relationship between the supply valve open time and the ammonia concentration at every possible exhaust gas flow speed is stored in the memory in the ECU 20. Graph (b) in FIG. 6 shows a control map at the exhaust gas flow speed that specifies the control point shown in graph (a) in FIG. 6. The filled circle in graph (b) in FIG. 6 corresponds to the filled circle representing the control point in graph (a) in FIG. 6. The control map shown in graph (b) in FIG. 6 represents the tendency that the longer the supply valve open time is, the lower the concentration of ammonia in the resultant reducing agent atmosphere is. Thus, a supply valve open time $\Delta f2$ for achieving the ammonia concentration X1 after the decrease $\Delta X$ calculated as above that prevents ammonia from reaching the second catalyst layer 32 is determined using the control map. After the completion of the processing of step S109, the process proceeds to step S110.

In step S110, an addition process is performed, in which urea solution is added through the supply valve 5 according to the supply valve open time $\Delta f2$ determined in step S109, in other words addition of urea solution is performed based on the diffusion model taking account of the flow speed. Thus, addition of urea solution shown by L4 in graph (a) in FIG. 3 is performed, and diffusion of ammonia in the NOx catalyst 3 shown by area R2 in diagram (b) in FIG. 3 is achieved consequently. In consequence, when the temperature of the NOx catalyst 3 is in the high temperature removal range T3, ammonia is prevented from reaching the second catalyst layer 32 with reliability, and the NOx removal rate of the NOx catalyst 3 can be maintained at a satisfactory level accordingly.

Now, we will describe the processing of steps S111 and S112, which is a reducing agent addition process performed in the case where a negative determination is made in step S108, in other words in the case where it is determined that reducing agent atmosphere having the aforementioned provisional ammonia concentration will not reach the second catalyst layer 32. In this case, it is presumed that ammonia will not reach the lower second catalyst layer 32. In step S111, it is calculated how much the concentration of ammonia in the reducing agent atmosphere is allowed to be increased to supply ammonia effectively to the first catalyst layer 31, based on the diffusion model taking account of the flow speed. In other words, it is calculated how much the concentration of ammonia is allowed to be increased in order to deliver a larger quantity of ammonia to the deep part of the first catalyst layer 31 while preventing ammonia from reaching the second catalyst layer 32. Specifically this amount of increase of the ammonia concentration is calculated based on the control map shown in graph (a) in FIG. 7. For example, in the case where the aforementioned control point is located at the position of the filled circle in graph (a) in FIG. 7, in order to shift the control point to a position located near the region in which the ammonia will reach the lower second catalyst layer 32 and in the region in which ammonia will not reach the lower second catalyst layer 32 (e.g. the position indicated by a hollow circle in graph (a) in FIG. 7) in the same exhaust gas flow speed condition, the concentration of ammonia is allowed to be increased to Y1 by an amount ΔY represented by a hollow arrow in graph (a) in FIG. 7. This amount of increase of the ammonia concentration is the amount of increase of the ammonia concentration calculated in step S111, and the ammonia concentration Y1 thus finally reached is the "specific concentration" mentioned in the context of the present invention.

In step S111, moreover, the supply valve open time for adding urea solution through the supply valve 5 to achieve the aforementioned increase of the ammonia concentration is also determined. Specifically, the supply valve open time is determined using a control map shown in graph (b) in FIG. 7. The control map shown in graph (b) in FIG. 7 defines relationship between the supply valve open time through which a specific addition quantity of urea solution is added and the ammonia concentration at a certain exhaust gas flow speed. A control map specifying the relationship between the supply valve open time and the ammonia concentration at every possible exhaust gas flow speed is stored in the memory in the ECU 20. Graph (b) in FIG. 7 shows a control map at the exhaust gas flow speed that specifies the control point shown in graph (a) in FIG. 7. The filled circle in graph (b) in FIG. 7 corresponds to the filled circle representing the control point in graph (a) in FIG. 7. The control map shown in graph (b) in FIG. 7 represents the tendency that the shorter the supply valve open time is, the higher the concentration of ammonia in the resultant reducing agent atmosphere is. Thus, a supply valve open time Δf2 for achieving the ammonia concentration Y1 after the increase ΔY calculated as above that prevents ammonia from reaching the second catalyst layer 32 is determined using the control map. After the completion of the processing of step S111, the process proceeds to step S112.

In step S112, an addition process is performed, in which urea solution is added through the supply valve 5 according to the supply valve open time Δf2 determined in step S111, in other words addition of urea solution is performed based on the diffusion model taking account of the flow speed. Thus, diffusion of ammonia in the NOx catalyst 3 shown by area R2 in diagram (b) in FIG. 3 is achieved, as in the addition process in step S110. In consequence, when the temperature of the NOx catalyst 3 is in the high temperature removal range T3, the concentration of ammonia diffusing in the first catalyst layer can be increased as much as possible while preventing ammonia from reaching the second catalyst layer 32 with reliability. Therefore, the NOx removal rate of the NOx catalyst 3 can be maintained at a satisfactory level accordingly.

Next, we will describe the processing of steps S113 and S114, which is performed in the case where an affirmative determination is made in step S105, in other words in the case where the temperature of the NOx catalyst 3 is in the low temperature removal range T2. In this case, it is necessary to deliver ammonia to the second catalyst layer 32. Therefore, it is preferable that the diffusion of ammonia shown by area R1 in diagram (b) in FIG. 3 be brought about. Therefore, in step S113, the supply valve open time of the supply valve 5 is determined on the assumption that ammonia is caused to diffuse in the NOx catalyst 3 according to the standard diffusion model. Therefore, the supply valve open time is determined based on the standard diffusion model. In step S114, an addition process based on the supply valve open time thus determined is performed.

In the case where a negative determination is made in step S105, addition of urea solution through the supply valve 5 is disabled (the processing of step S115). This is because when the temperature of the NOx catalyst 3 is in the excessively high temperature range T4, there is a concern that ammonia produced from urea solution added may be converted into NOx.

As above, when the temperature of the NOx catalyst 3 is in the high temperature removal range T3, this control process can supply ammonia to the first catalyst layer 31 appropriately taking account of the flow speed of the exhaust gas flowing into the NOx catalyst 3 while preventing ammonia from reaching the second catalyst layer 32. In consequence, the efficiency of reduction of NOx by the NOx catalyst 3 in the high temperature state can be improved advantageously. In the above described NOx removal control, when the temperature of the NOx catalyst 3 is in the high temperature removal range T3 and it is determined in step S108 that ammonia will not reach the second catalyst layer 32, the processing of step S111 is performed. Alternatively, the processing of step S111 may be done away with. In that case, the addition process for increasing the concentration of ammonia is not performed, but the addition process according to the supply valve open time for achieving the provisional ammonia concentration calculated in step S107 is performed instead.

<First Modification>

A mode of addition of urea solution through the supply valve 5 performed when the temperature of the NOx catalyst 3 is in the high temperature removal range T3 will be described with reference to FIGS. 8A to 8D. FIGS. 8A to 8D illustrate how addition of urea solution is controlled in order to control the concentration of ammonia in the reducing agent atmosphere when adding a specific addition quantity of urea solution through the supply valve 5. While in the addition of urea solution in the above-described embodiment a specific addition quantity of urea solution is added by single injection (or addition) of urea solution through the supply valve 5, the addition of urea solution illustrated in FIGS. 8A to 8D is carried out in a spike mode in which injection (or addition) of urea solution through the supply valve 5 into the exhaust gas and suspension of injection are alternated. Thus, a specific quantity of urea solution is added in a plurality of addition spikes during a predetermined period (addition period). In other words, in the addition of urea solution in the spike mode, a specific quantity of urea solution is added in total by injection of urea solution according to the supply valve open time that is performed repeatedly at predetermined intervals during the addition period.

Firstly, addition of urea solution shown in FIG. 8A will be described. FIG. 8A shows four patterns of addition of urea solution in spikes. In all the patterns, the total quantity of urea solution added through the supply valve 5 to the exhaust gas through the addition period is the same specific addition quantity. In the bottom pattern in FIG. 8A, urea solution is added to the exhaust gas through the supply valve 5 in eight spikes, and the total quantity of urea solution thus added amounts to the specific addition quantity. In the second to bottom pattern, a quantity of urea solution added by the fourth spike P4 in the bottom pattern is equally distributed to the first to third spikes P1 to P3. Thus, there are spikes P11, P12, and P13 in the second to bottom pattern. Similarly, a quantity of urea solution added by the eighth spike P8 in the bottom pattern is equally distributed to the fifth to seventh spikes P5 to P7. Thus, there are spikes P14, P15, and P16 in the second to bottom pattern. The timing of the spikes is the same as that in the bottom pattern. In this second to bottom pattern, while the quantity of urea solution added through the addition period is the same specific addition quantity, the concentration of ammonia in the reducing agent atmosphere formed in the exhaust gas can be made higher than that in the bottom pattern.

In the third to bottom pattern, the quantity of urea solution added in each spike is the same as that in the second to bottom pattern, but the intervals between the first to third spikes are shortened, and the intervals between the fourth to sixth spikes are also shortened. The timing of the first spike P21 and the fourth spike P24 is the same as that in the second to bottom pattern. In this third to bottom pattern, while the quantity of urea solution added through the addition period is the same specific addition quantity, the concentration of ammonia in the reducing agent atmosphere formed in the exhaust gas can be made further higher than that in the second to bottom pattern.

In the top pattern, while the timing of spikes are the same as that in the third to bottom pattern, a quantity of urea solution added by the third spike P23 in the third to bottom pattern is equally distributed to the first and second spikes P21 and P22. Thus, there are spikes P31 and P32 in the top pattern. Similarly, a quantity of urea solution added by the sixth spike P26 in the third to bottom pattern is equally distributed to the fourth and fifth spikes P24 and P25. Thus, there are spikes P33 and P34 in the top pattern. In the top pattern, while the quantity of urea solution added through the addition period is the same specific addition quantity, the concentration of ammonia in the reducing agent atmosphere formed in the exhaust gas can be made further higher than that in the third to bottom pattern.

As above, even in cases where the same specific addition quantity of urea solution is added through the supply valve 5, the concentration of ammonia in the reducing agent atmosphere formed in the exhaust gas can be controlled appropriately by controlling the quantity of urea solution added by each spike and the spike intervals. Therefore, in the addition process that is performed in order to prevent ammonia from reaching the second catalyst layer 32 when the temperature of the NOx catalyst 3 is in the high temperature removal range T3, a reducing agent atmosphere having a desired ammonia concentration can be formed by controlling the quantity of urea solution added by each spike and the spike intervals.

Next, we will describe addition of urea solution shown in FIG. 8B. FIG. 8B also shows four patterns of addition of urea solution in spikes. In the case shown in FIG. 8B, the second to bottom pattern is created by distributing a quantity of urea solution added by the fourth spike P4 in the bottom pattern to spikes P1 to P3 and distributing a quantity of urea solution added by the eighth spike P8 in the bottom pattern to spikes P5 to P7. In this case, the urea solution is distributed not equally but in such a way that the quantities of urea solution added by the spikes increase in the order of spikes P11, P12, and P13 and in the order of spikes P14, P15, and P16. Similarly, the top pattern in FIG. 8B is created by distributing the urea solution in such a way that the quantities of urea solution added by the spikes increase in the order of spikes P31 and P32 and in the order of spikes P33 and P34. Besides the above, the patterns shown in FIG. 8B are created in the same manner as those in FIG. 8A and will not be described in further detail. As shown in FIG. 8B, even in cases where the same specific addition quantity of urea solution is added through the supply valve 5, the concentration of ammonia in the reducing agent atmosphere formed in the exhaust gas can be controlled appropriately by controlling the quantity of urea solution added by each spike and the spike intervals.

Next we will describe addition of urea solution shown in FIG. 8C. FIG. 8C also shows four patterns of addition of urea solution in spikes. The quantities of urea solution added by the respective spikes in the patterns shown in FIG. 8C are the same as the quantities of urea solution added by the respective spikes in the patterns shown in FIG. 8A, but the timing of the spikes is different from the timing in the patterns shown in FIG. 8A. Specifically, the timing of the spikes in the patterns shown in FIG. 8C is arranged in such a way that all the spike intervals in each pattern are equal. Thus, in the second to bottom pattern and in the top pattern, equally distributed spikes are arranged at regular intervals. In the third to bottom pattern, the spikes are arranged at reduced regular intervals. As shown in FIG. 8C, even in cases where the same specific addition quantity of urea solution is added through the supply valve 5, the concentration of ammonia in the reducing agent atmosphere formed in the exhaust gas can be controlled appropriately by controlling the quantity of urea solution added by each spike and the spike intervals.

Next, we will describe addition of urea solution shown in FIG. 8D. FIG. 8D also shows four patterns of addition of urea solution in spikes. The quantities of urea solution added by the respective spikes in the patterns shown in FIG. 8D are the same as the quantities of urea solution added by the respective spikes in the patterns shown in FIG. 8B, but the timing of the spikes is different from the timing in the patterns shown in FIG. 8B. Specifically, the timing of the spikes in the patterns shown in FIG. 8D is arranged in such a way that all the spike intervals in each pattern are equal. Thus, in the second to bottom pattern and in the top pattern, distributed spikes are arranged at regular intervals. In the third to bottom pattern, the spikes are arranged at reduced regular intervals. As shown in FIG. 8D, even in cases where the same specific addition quantity of urea solution is added through the supply valve 5, the concentration of ammonia in the reducing agent atmosphere formed in the exhaust gas can be controlled appropriately by controlling the quantity of urea solution added by each spike and the spike intervals.

<Second Modification>

While in the examples described in the foregoing, Cu-exchanged NOx catalyst is used as catalyst particles contained in the second catalyst layer 32, the Cu-exchanged catalyst may be replaced by SnMnCeOx, which is a manganese oxide. Since SnMnCeOx is a known material that can be produced by a known precipitation method, it will not be described here in detail.

Second Example

Another constitution of the NOx catalyst 3 that can be used in the exhaust gas purification apparatus for the internal combustion engine 1 according to the present invention will be described with reference to FIG. 9. As with the NOx catalyst 3 used in the above-described embodiments, the NOx catalyst 3 shown in FIG. 9 has an uppermost first catalyst layer 31. Moreover, the NOx catalyst 3 shown in FIG. 9 has an oxidation catalyst layer 35 instead of the second catalyst layer 32, arranged below the first catalyst layer 31 and on a catalyst substrate 33. With the NOx catalyst 3 having the above-described constitution, when the temperature of the NOx catalyst 3 is in the high temperature removal range T3, NO (nitrogen monoxide) contained in the exhaust gas is oxidized into $NO_2$ by the oxidation capability of the oxidation catalyst layer 35, whereby reduction reaction of NOx in the first catalyst layer 31 can be promoted. Alternatively, this NOx catalyst having the first catalyst layer 31 and the oxidation catalyst layer 35 may be used as the aforementioned ASC catalyst provided downstream of the NOx catalyst 3.

In the case of the NOx catalyst having the oxidation catalyst layer 35 also, to achieve efficient reduction of NOx by the first catalyst layer 31 when the temperature of the NOx catalyst is in the high temperature removal range T3, it is basically undesirable for ammonia serving as a reducing agent to reach the underlying oxidation catalyst layer 35. Therefore, the above-described NOx removal control may be applied to this type of NOx catalyst also to perform an addition process that prevents ammonia from reaching the lower layer. This can improve the efficiency of NOx reduction by the NOx catalyst.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-083777, filed on Apr. 15, 2015, which is hereby incorporated by reference herein in its entirety.

REFERENCE SIGNS LIST

1: internal combustion engine
2: exhaust passage
3: NOx catalyst
5: supply valve
20: ECU
31: first catalyst layer
32: second catalyst layer
33: catalyst substrate
35: oxidation catalyst

The invention claimed is:

1. An exhaust gas purification apparatus for an internal combustion engine comprising:
   a selective catalytic reduction NOx catalyst having a catalyst substrate and catalyst layers made up of catalyst particles having the property of selectively reducing NOx with a reducing agent derived from ammonia arranged on the catalyst substrate, the catalyst layers including at least a first catalyst layer having capability of reducing NOx and a second catalyst layer having oxidation capability arranged closer to said catalyst substrate than said first catalyst layer;
   a supply valve for adding a specific addition quantity of reducing agent for reducing NOx to inflowing exhaust gas flowing into said selective catalytic reduction NOx catalyst; and
   a controller that is configured to control addition of the reducing agent by said supply valve based on the flow speed of said inflowing exhaust gas in such a way that the concentration of the reducing agent in a reducing agent atmosphere formed in said inflowing exhaust gas in a reducing agent addition period becomes equal to a specific concentration that is determined based on the flow speed of said inflowing exhaust gas and at which the reducing agent is assumed not to reach said second catalyst layer, when the temperature of the selective catalytic reduction NOx catalyst exceeds a specific temperature at which reduction of NOx by said first catalyst layer is carried out.

2. An exhaust gas purification apparatus for an internal combustion engine according to claim 1, wherein when the temperature of the selective catalytic reduction NOx catalyst exceeds said specific temperature, said controller controls addition of the reducing agent by said supply valve based on the flow speed of said inflowing exhaust gas in such a way that the concentration of the reducing agent in the reducing agent atmosphere formed in said inflowing exhaust gas becomes equal to said specific concentration that is set lower when the flow speed of said inflowing exhaust gas is low than when the flow speed of said inflowing exhaust gas is high, provided that said specific addition quantity is the same.

3. An exhaust gas purification apparatus for an internal combustion engine according to claim 2, wherein as said specific addition quantity of reducing agent is added to the exhaust gas by said supply valve, the reducing agent concentration in said reducing agent atmosphere changes with time to eventually reach said specific concentration, and the difference between the highest value and the lowest value of the reducing agent concentration in said reducing agent atmosphere in the case where the flow speed of said inflowing exhaust gas is low is smaller than the difference between the highest value and the lowest value of the reducing agent concentration in said reducing agent atmosphere in the case where the flow speed of said inflowing exhaust gas is high.

4. An exhaust gas purification apparatus for an internal combustion engine according to claim 2, wherein as said specific addition quantity of reducing agent is added to the exhaust gas by said supply valve, the reducing agent concentration in said reducing agent atmosphere changes with time to eventually reach said specific concentration, and the peak value of the reducing agent concentration in said reducing agent atmosphere in the case where the flow speed of said inflowing exhaust gas is low is lower than the peak value of the reducing agent concentration in said reducing agent atmosphere in the case where the flow speed of said inflowing exhaust gas is high.

5. An exhaust gas purification apparatus for an internal combustion engine according to claim 2, wherein said first catalyst layer is a catalyst layer having high NOx reduction capability at high temperatures, said second catalyst layer is a catalyst layer having high NOx reduction capability at low temperatures, and said second catalyst layer has higher capability of oxidizing said reducing agent when the temperature of said selective catalytic reduction NOx catalyst is higher than said specific temperature than when the temperature of said selective catalytic reduction NOx catalyst is not higher than said specific temperature.

6. An exhaust gas purification apparatus for an internal combustion engine according to claim 2, further comprising:
a determiner that is configured to determine whether or not the reducing agent will reach said second catalyst layer, when the temperature of said selective catalytic reduction NOx catalyst is higher than said specific temperature; and
a concentration decrease calculator that is configured to calculate an amount of decrease by which the concentration of the reducing agent in said inflowing exhaust gas is to be decreased by said controller, when it is determined by said determiner that the reducing agent will reach said second catalyst layer,
wherein said controller controls addition of the reducing agent by said supply valve in accordance with said amount of decrease of the concentration of the reducing agent calculated by said concentration decrease calculator to make the concentration of the reducing agent in said inflowing exhaust gas equal to said specific concentration.

7. An exhaust gas purification apparatus for an internal combustion engine according to claim 6, further comprising a concentration increase calculator that is configured to calculate an amount of increase by which the concentration of the reducing agent in said inflowing exhaust gas can be increased by said controller within the limits of not causing the reducing agent to reach said second catalyst layer, when it is determined by said determiner that the reducing agent will not reach said second catalyst layer,
wherein said controller controls addition of the reducing agent by said supply valve in accordance with said amount of increase of the concentration of the reducing agent calculated by said concentration increase calculator.

8. An exhaust gas purification apparatus for an internal combustion engine according to claim 2, wherein when adding said specific addition quantity of reducing agent to exhaust gas, said controller makes the concentration of the reducing agent in said inflowing exhaust gas lower by decreasing the quantity of reducing agent added by said supply valve per unit time and increasing a supply valve open time of said supply valve.

9. An exhaust gas purification apparatus for an internal combustion engine according to claim 2, wherein said specific addition quantity of reducing agent is added to the exhaust gas in a manner in which addition of the reducing agent and suspension of addition are alternated, and said controller makes the concentration of the reducing agent in said inflowing exhaust gas lower by making the interval between successive additions of the reducing agent longer.

* * * * *